(12) United States Patent
Riley

(10) Patent No.: US 10,884,097 B2
(45) Date of Patent: Jan. 5, 2021

(54) MONITORING THE PRESENCE OF OBJECTS USING ELECTRICAL DEVICES

(71) Applicant: SIGNIFY HOLDING B.V., Eindhoven (NL)

(72) Inventor: Peyton Riley, Suwanee, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/674,540

(22) Filed: Nov. 5, 2019

(65) Prior Publication Data

US 2020/0142021 A1    May 7, 2020

Related U.S. Application Data

(60) Provisional application No. 62/756,274, filed on Nov. 6, 2018.

(51) Int. Cl.
| | | |
|---|---|---|
| *G01S 5/14* | (2006.01) | |
| *G01S 5/00* | (2006.01) | |
| *G01S 5/02* | (2010.01) | |

(52) U.S. Cl.
CPC ............ *G01S 5/0036* (2013.01); *G01S 5/021* (2013.01); *G01S 5/0221* (2013.01); *G01S 5/0294* (2013.01); *G01S 5/14* (2013.01)

(58) Field of Classification Search
CPC ..... H04W 4/029; H04W 12/06; H04W 64/00; H04W 68/005; G06Q 30/0639; G06Q 10/08; G06Q 30/0257; G06Q 30/0259; G06Q 30/0261; G01S 5/0036; G01S 5/0294; G01S 5/021; G01S 5/0221; G01S 5/14

See application file for complete search history.

(56) References Cited

U.S. PATENT DOCUMENTS

| | | | |
|---|---|---|---|
| 8,810,392 B1 | 8/2014 | Teller et al. | |
| 9,470,776 B2* | 10/2016 | Chan | A61B 5/0031 |
| 9,489,821 B2* | 11/2016 | King | G08B 21/24 |
| 9,504,004 B1* | 11/2016 | Auvenshine | H04W 4/029 |
| 9,716,972 B2 | 7/2017 | Logan et al. | |
| 9,741,008 B2* | 8/2017 | Loutit | H04W 12/06 |
| 9,779,392 B1* | 10/2017 | Prasad | G06Q 20/042 |
| 9,818,148 B2* | 11/2017 | Bynum | G06Q 30/0261 |
| 9,886,837 B1* | 2/2018 | Alexander | G08B 21/0227 |
| 10,580,281 B2* | 3/2020 | Daoura | G08B 21/0277 |
| 2003/0233165 A1* | 12/2003 | Hein | G06Q 10/087 700/216 |

(Continued)

*Primary Examiner* — Jean A Gelin

(57) ABSTRACT

A system for monitoring a presence of an object in a volume of space can include a controller and a first electrical device coupled to the controller, where the first electrical device is disposed in the volume of space and includes a first receiver, where the first receiver has a first communication range. The system can also include an object having a beacon having an object communication range, where the beacon sends multiple signals that are received by the first receiver when the object communication range overlaps with the first communication range, where each signal includes an identification of the object. The controller can determine a first point in time when none of the signals is received, where the controller determines at the first point in time that the object is removed from a first location defined by the first communication range.

19 Claims, 11 Drawing Sheets

(56) References Cited

U.S. PATENT DOCUMENTS

| | | | |
|---|---|---|---|
| 2011/0251920 A1* | 10/2011 | Watson | G01C 21/206 |
| | | | 705/26.9 |
| 2016/0056971 A1* | 2/2016 | Kazanchian | G08C 17/02 |
| | | | 340/4.3 |
| 2016/0292974 A1* | 10/2016 | Folk | H04W 4/80 |
| 2016/0323754 A1* | 11/2016 | Friday | H04W 16/28 |
| 2016/0345137 A1* | 11/2016 | Ruiz | H04W 4/027 |
| 2020/0011959 A1* | 1/2020 | Abou-Rizk | G01S 5/0247 |
| 2020/0142021 A1* | 5/2020 | Riley | G01S 5/0294 |

* cited by examiner

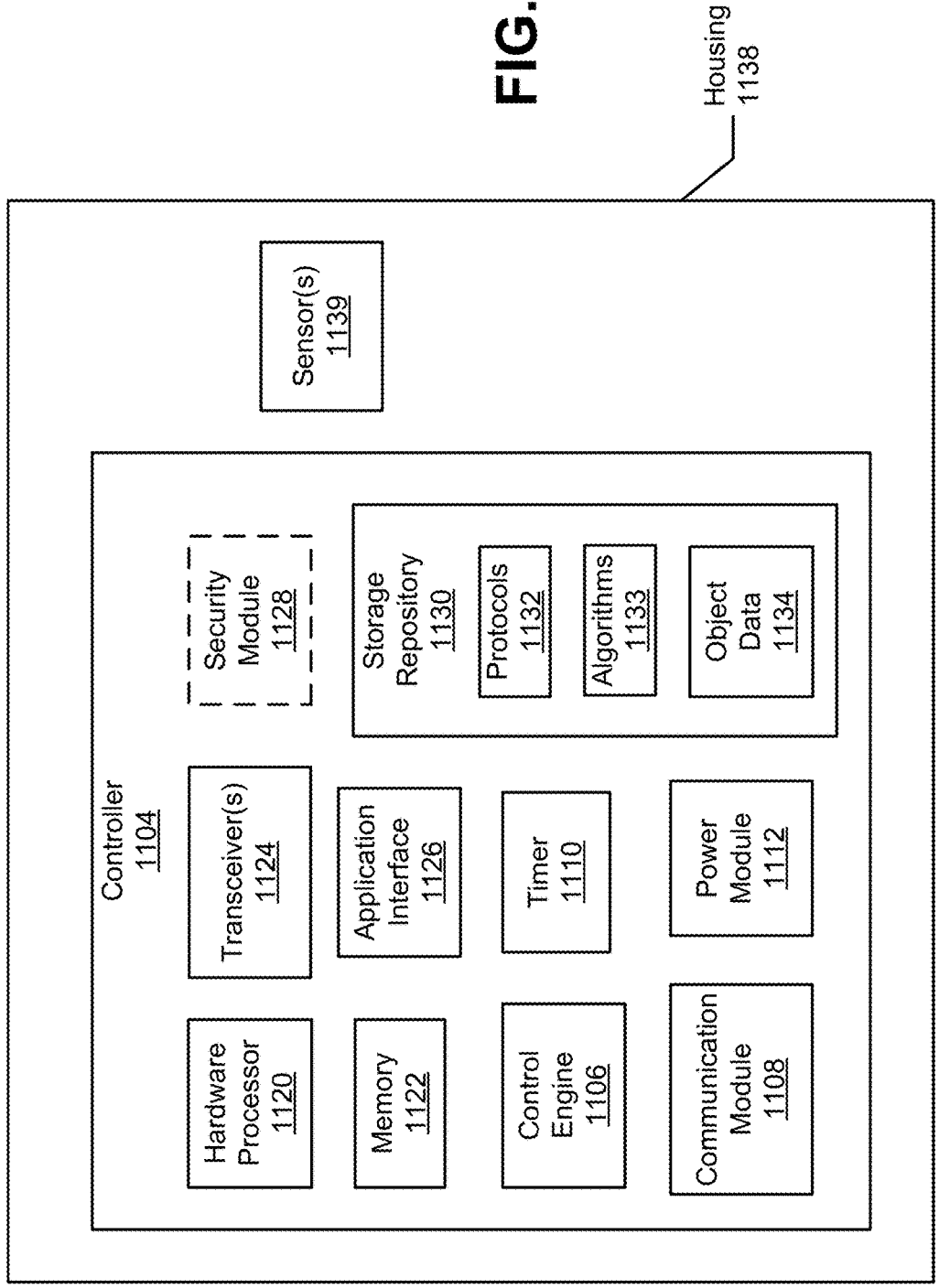

MONITORING THE PRESENCE OF OBJECTS USING ELECTRICAL DEVICES

CROSS REFERENCE TO RELATED APPLICATIONS

This application claims priority under 35 U.S.C. § 119 to U.S. Provisional Patent Application Ser. No. 62/756,274, titled "Monitoring the Presence of Objects Using Electrical Devices" and filed on Nov. 6, 2018, the entire contents of which are hereby incorporated herein by reference.

TECHNICAL FIELD

Embodiments described herein relate generally to monitoring the presence of objects in a space, and more particularly to systems, methods, and devices for monitoring the presence of objects in a space using electrical devices.

BACKGROUND

In many applications, particularly in residential settings, there can be a number of movable objects in a volume of space. Some of these objects can be valuable. Other objects can be frequently used but misplaced at times. Considerable time can be spent looking for lost objects. Also, a number of valuable objects are not commonly in a visible place, and so their absence may not be noticed for some period of time after they have been removed, particularly if there are no obvious signs of a break-in.

SUMMARY

In general, in one aspect, the disclosure relates to a system for monitoring a presence of an object in a volume of space. The system can include a controller and a first electrical device coupled to the controller, where the first electrical device is disposed in the volume of space and comprises a first receiver, where the first receiver has a first communication range. The system can also include an object that includes a beacon having an object communication range, where the beacon is capable of communicating with the first receiver when the object communication range overlaps with the first communication range, where the beacon sends multiple signals that are received by the first receiver when the object communication range overlaps with the first communication range, where each of the signals includes an identification of the object. The controller can track receipt of the plurality of signals received by the first receiver over time. The controller can determine a first point in time when none of the signals is received, where the controller determines at the first point in time that the object is removed from a first location within the volume of space, where the first location is defined by the first communication range.

In another aspect, the disclosure can generally relate to an electrical device used to locate an object in a volume of space. The electrical device can include a receiver having a first communication range, where the receiver is configured to receive at least one object signal broadcast by an object when the at least one object signal is within the first communication range. The electrical device can also include a controller coupled to the receiver, where the controller is configured to determine, using the at least one object signal received by the receiver during a first time, that the object is located within the first communication range in the volume of space, and where the controller is further configured to determine that the object has been moved at a second time when the receiver stops receiving the at least one object signal.

These and other aspects, objects, features, and embodiments will be apparent from the following description and the appended claims.

BRIEF DESCRIPTION OF THE DRAWINGS

The drawings illustrate only example embodiments of monitoring the presence of objects using electrical devices and are therefore not to be considered limiting of its scope, as monitoring the presence of objects using electrical devices may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 11 shows a diagram of an integrated sensor module in accordance with certain example embodiments.

DETAILED DESCRIPTION OF EXAMPLE EMBODIMENTS

Figure 1:
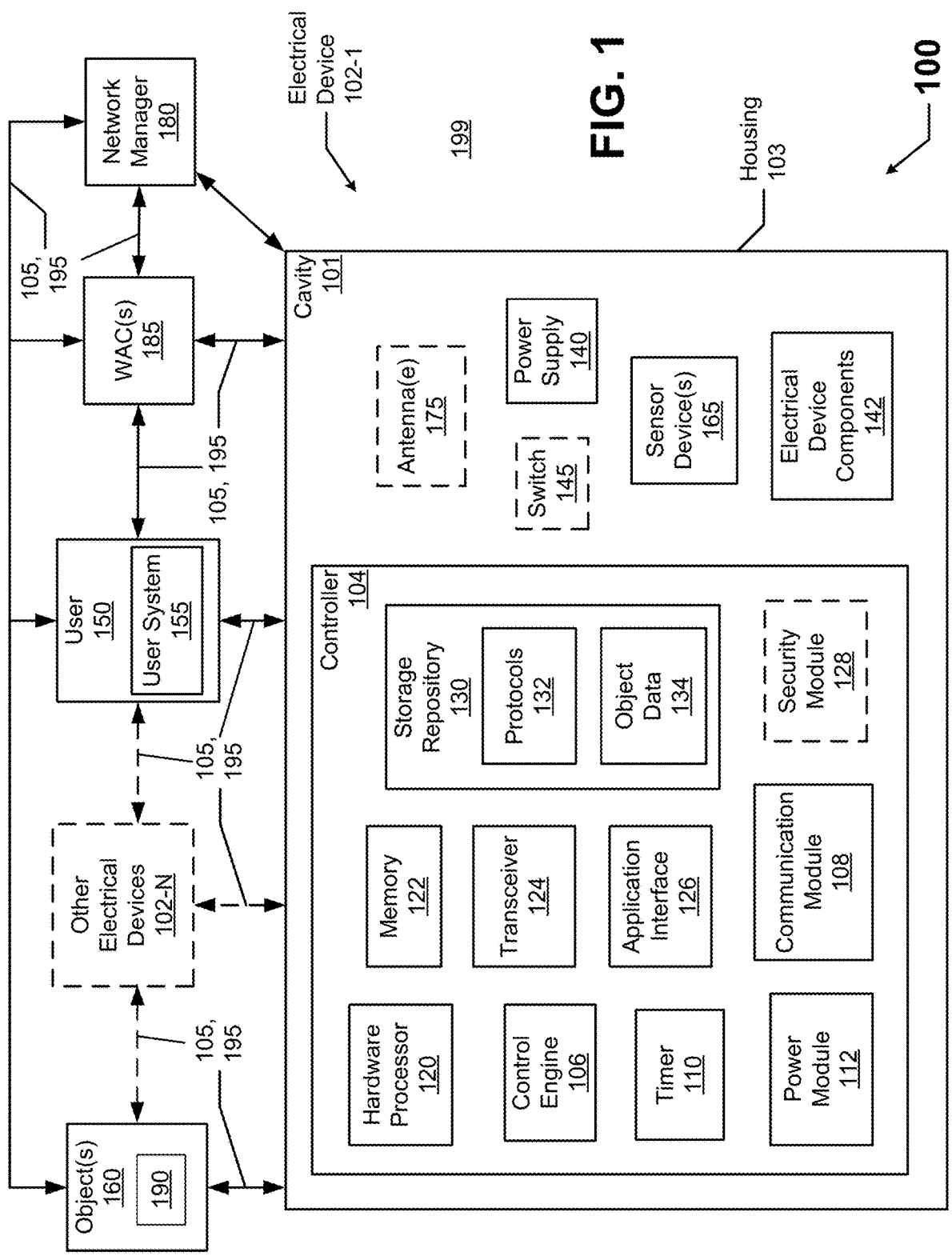
FIG. 1 shows a diagram of a system that includes an electrical device in accordance with certain example embodiments.

The example embodiments discussed herein are directed to systems, methods, and devices for monitoring the presence of objects using electrical devices. While example embodiments are described herein as using a light fixture (or components thereof) to monitor an object in a volume of space, example embodiments can use one or more of a number of other electrical devices in addition to, or as an alternative to, light fixtures. Such other electrical devices can include, but are not limited to, a light switch, a control panel, a clock, a coffee maker, a voice-activated control device, a control panel, a microwave oven, a wall outlet, an integrated sensor device (defined below) (e.g., a smoke detector, a $CO_2$ monitor, a motion detector, a broken glass sensor), a user system (defined below), and a camera.

Example embodiments can be used for a volume of space having any size and/or located in any environment (e.g., indoor, outdoor, hazardous, non-hazardous, high humidity, low temperature, corrosive, sterile, high vibration, residential, office space, factory, industrial). Further, while signals described herein are radio frequency (RF) signals using Bluetooth Low Energy (BLE), example embodiments can be used with any of a number of other types of signals, including but not limited to WiFi, Bluetooth, RFID, ultraviolet waves, microwaves, and infrared signals. Example embodiments can be used to monitor the presence of an object in a volume of space in real time.

Example embodiments can be implemented using systems that are configured as a real-time location system (RTLS). With RTLS, any of a number of location methods can be used to locate one or more objects in real-time. Examples of such location methods can include, but are not limited to, triangulation, time-of-flight (ToF), angle of arrival (AoA), and angle of departure (AoD). Any of these methods can involve measurements of one or more parameters with respect to signals (e.g., communication signals). Examples of such parameters can include, but are not limited to, distance of travel, angle, signal strength (e.g., RSSI), and time of travel. Regardless of the location method used, these signals include an identification of an object.

When an electrical device is a light fixture, the light fixture can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source. Also, the light fixture can be any type of light fixture, including but not limited to a down can light, a pendant light, a high bay light, a vanity light, a spotlight a flood light, and a wall sconce.

As defined herein, an object can be any unit or group of units. An object can move on its own, is capable of being moved, or is stationary. Examples of an object can include, but are not limited to, a person (e.g., a user, a visitor, an employee), a part (e.g., a motor stator, a cover), a piece of equipment (e.g., a fan, a container, a table, a chair, a computer, a printer), or a group of parts of equipment (e.g., a pallet stacked with inventory). In some cases, an object can also be an electrical device.

In certain example embodiments, light fixtures or other electrical devices used to monitor the presence of an object are subject to meeting certain standards and/or requirements. For example, the National Electric Code (NEC), the National Electrical Manufacturers Association (NEMA), the International Electrotechnical Commission (IEC), Underwriters Laboratories (UL), the Federal Communication Commission (FCC), the Bluetooth Special Interest Group, and the Institute of Electrical and Electronics Engineers (IEEE) set standards that can be applied to electrical enclosures (e.g., housings of light fixtures), wiring, location services, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of monitoring the presence of objects using electrical devices will be described more fully hereinafter with reference to the accompanying drawings, in which example embodiments of monitoring the presence of objects using electrical devices are shown. Monitoring the presence of objects using electrical devices may, however, be embodied in many different forms and should not be construed as limited to the example embodiments set forth herein. Rather, these example embodiments are provided so that this disclosure will be thorough and complete, and will fully convey the scope of monitoring the presence of objects using electrical devices to those of ordinary skill in the art. Like, but not necessarily the same, elements (also sometimes called components) in the various figures are denoted by like reference numerals for consistency.

Terms such as "first", "second", "outer", "inner", "top", "bottom", "on", and "within" are used merely to distinguish one component (or part of a component or state of a component) from another. Such terms are not meant to denote a preference or a particular orientation, and such terms are not meant to limit embodiments of monitoring the presence of objects using electrical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes an electrical device 102-1 in accordance with certain example embodiments. The system 100 can include one or more objects 160, a user 150, one or more WACs 185, one or more other optional electrical devices 102-N, and a network manager 180. Each electrical device 102 (a term used to collectively describe the electrical device 102-1 and the other optional electrical devices 102-N) can include a controller 104, one or more optional antenna 175, an optional switch 145, a power supply 140, one or more sensor devices 165, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in the example system 100. For instance, any component of the example electrical device 102-1 can be discrete or combined with one or more other components of the electrical device 102-1. For example, rather than one optional switch 145, there can be multiple optional switches 145. As another example, the optional switch 145 can be part of the controller 104. As yet another example, one or more components shown for the electrical device 102-1 (e.g., the controller 104, a sensor device 165) can be included in, excluded from, or shared with one or more of the other electrical devices 102-N. As still another example, the controller 104 can be a stand-alone device in the system.

A user 150 can be any person that interacts with an electrical device 102 and/or object 160 in a volume of space 199. For example, a user 150 may program, operate, and/or interface with one or more components (e.g., a controller, a network manager) associated with a system using example embodiments. Examples of a user 150 may include, but are not limited to, a homeowner, a renter, a landlord, a technician, an operator, a consultant, a contractor, a network manager, and a manufacturer's representative.

A user 150 can use a user system 155 (also sometimes called a user device 155 herein), which may include a display (e.g., a GUI). A user 150 (including an associated user system 155) interacts with (e.g., sends data to, receives data from) the controller 104 of the electrical devices 102 via the application interface 126 (described below). A user 150 (including an associated user system 155) can also interact with the network manager 180, one or more WACs 185, one or more sensor devices 165, and/or one or more of the objects 160. Interaction between a user 150 (including an associated user system 155), the electrical devices 102, and the network manager 180 is conducted in the form of communication signals 195 using one or more communication links 105. In some cases, a user 150 (including an associated user system 155), the electrical devices 102, and/or the network manager 180 can also transmit communication signals 195 with the object 160 using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), WirelessHART, ISA100, Power Line Carrier, RS485, DALI) technology. For example, a communication link 105 can be (or include) one or more electrical conductors that are coupled to the housing 103 of the electrical device 102-1 and to the network manager 180. The communication link 105 can transmit communication signals 195 (e.g., control signals, data) between one or more of the electrical devices 102, one or more of the objects 160, the users 150 (including associated user systems 155), one or more WACs 185, one or more sensor devices 165, and the network manager 180.

The network manager 180 is a device or component that controls all or a portion of the system 100 that includes the controller 104 of the electrical device 102-1. The network manager 180 can be substantially similar to (e.g., in terms of components, in terms of functionality) the controller 104. Alternatively, the network manager 180 can include one or more of a number of features in addition to, or altered from, the features of the controller 104 described below. In some cases, the network manager 180 can share some components and/or capability of the controller 104 of the electrical device 102-1. In some cases, the network manager 180 can be the controller 104 of the electrical device 102-1 and/or one or more of the other electrical devices 102-N.

Each WAC 185 (sometimes more simply called an access controller, as a generic term and/or when wired communication links 105 are involved) performs a number of different functions. For example, a WAC 185 can help communicate with and control the controller 104 of one or more electrical devices 102 to help operate those electrical devices 102. For RTLS applications, the WAC 185 can be responsible for pairing with the Zigbee-enabled integrated sensor devices 165 and/or other electrical devices 102, providing configuration data to the integrated sensor devices 165 and/or other electrical devices 102, synchronizing the timing of those integrated sensor devices 165 and/or other electrical devices 102, supporting the firmware of those integrated sensor devices 165 and/or other electrical devices 102, upgrading those integrated sensor devices 165 and/or other electrical devices 102, receiving location/telemetry data (e.g., using a Zigbee-enabled communication links 105) from the integrated sensor devices 165 and/or other electrical devices 102, and/or performing any other function with respect to those integrated sensor devices 165 and/or other electrical devices 102 to support RTLS activities, which can include establishing and maintaining alternative identification values for one or more objects 160.

When a WAC 185 receives data (e.g., packed egress data that arrives as ingress data) from an integrated sensor device 165 and/or other electrical device 102, the WAC 185 can convert the data into a different format (e.g., ECAPI). The WAC 185 can then send the newly-formatted data to the network manager 180. To help diagnose issues, a WAC 185 can maintain counters for each paired integrated sensor device 165 and/or other electrical device 102 and include, for example, the number of received packed data messages from a particular integrated sensor device 165 and/or other electrical device 102, the number of formatted messages successfully transmitted to the network manager 180 that pertain to the packed data from a particular integrated sensor device 165 and/or other electrical device 102, and the number of formatted messages pertaining to the packed data from a particular integrated sensor device 165 and/or other electrical device 102 that failed to transmit to the network manager 180.

In some cases, a WAC 185 maintains the average and maximum latency introduced between the receipt of a message from an integrated sensor device 165 and/or other electrical device 102 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to an integrated sensor device 165 and/or other electrical device 102. When there are multiple WACs 185, they can all be time-synchronized with each other. In some cases, the features (e.g., modules) included with and/or the functions performed by a WAC 185 can be substantially the same as those included with and/or performed by the controller 104 of electrical device 102-1. A WAC 185 can be located in the volume of space 199 or remotely from the volume of space 199.

The one or more objects 160 are described above. For example, an object 160 can be any of a number of people and/or devices (including, in some cases, an electrical device 102) in the volume of space 199. Each object 160 can include a communication device 190, which can send communication signals 195 to and/or receive communication signals 195 from one or more of the electrical devices 102. The communication device 190 can include one or more components (e.g., switch, antenna, transceiver) of the electrical device 102-1 and/or functionality described below with respect to the controller 104 of the electrical device 102-1. The communication signals 195 described herein can be RF signals that are transmitted in any of a number of ways, including BLE.

Using example embodiments, the communication device 190 (also sometimes called a beacon) of the object 160 can be in sleep mode until the communication device 190 receives a communication signal 195 broadcast by one or more antennae 175 of the electrical device 102-1. When this occurs, the communication device 190 can turn on long enough to interpret the initial communication signal 195, and then generate and send its own communication signal 195 to the electrical device 102-1 in response to the initial communication signal 195.

Alternatively, the communication device 190 of the object 160 can be in sleep mode until some pre-determined point in time (e.g., every hour, every 24 hours) that is independent of the antennae 175 of the electrical device 102 or communication signals 195 sent by the electrical device 102. When this occurs, the communication device 190 can turn on long enough to send (broadcast) a communication signal 195 into the volume of space 199, where the communication signal 195 can be received by the electrical device 102 and/or other electrical devices 102-N. In any case, the communication signal 195 sent by the object 160 can include a UUID (or some other form of identification) associated with the object 160. Once the communication signal 195 is sent by the communication device 190 of the object 160, the communication device 190 can go back into sleep mode, thereby reserving a considerable amount of power.

The communication device 190 of the object 160 can use one or more of a number of communication protocols (types of protocols 132 discussed below) in transceiving communication signals 195 with the antennae 175 of the electrical device 102-1. In certain example embodiments, an object 160 (or communication device 190 thereof) can include a battery (a form of power supply 140 or power module 112) that is used to provide power, at least in part, to some or all of the rest of the object 160, including the communication device 190.

In certain example embodiments, the communication device 190 can include multiple antennae and a corresponding switch, where an antenna is substantially the same as an antenna 175 described below with respect to the electrical device 102, and the optional switch is substantially the same as the optional switch 145 described below with respect to the electrical device 102-1. Alternatively, the communication device 190 of the object 160 can include a single antenna or have no antenna.

The users 150 (including associated user systems 155), the network manager 180, one or more of the WACs 185, one or more of the sensor devices 165, and/or any other electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the users 150 (including an associated user system 155), one or more objects 160, one or more of the WACs 185, one or more of the sensor devices 165, the controller 104 of one or more other electrical devices 102-N, and the network manager 180.

A user 150 (including an associated user system 155), an object 160 (including, in some cases, the communication device 190 of an object 160), one or more of the WACs 185, one or more of the sensor devices 165, and the network manager 180 can include an interface to receive data from and/or send data to the controller 104 in certain example embodiments. Examples of such an interface can include, but are not limited to, a graphical user interface, a touch-screen, an application programming interface, a keyboard, a monitor, a mouse, a web service, a data protocol adapter, some other hardware and/or software, or any suitable combination thereof. Similarly, the electrical device 102-1 and/or the other electrical devices 102-N can include such an interface.

The controller 104 of the electrical device 102-1, the controllers of one or more other electrical devices 102-N, a user 150 (including an associated user system 155), one or more of the WACs 185, one or more of the sensor devices 165, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). For example, if the electrical device 102-1 is located in an explosive environment, the housing 103 can be explosion-proof. According to applicable industry standards, an explosion-proof enclosure is an enclosure that is configured to contain an explosion that originates inside, or can propagate through, the enclosure.

The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the one or more antenna 175, the optional switch 145, the one or more sensor devices 165, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with a user 150 (including an associated user system 155), the network manager 180, and one or more of the objects 160, one or more of the WACs 185, one or more of the sensor devices 165, and any other applicable electrical devices 102-N within the system 100. In one or more example embodiments, the storage repository 130 stores one or more protocols 132 and object data 134. The protocols 132 can be any procedures (e.g., a series of method steps) and/or other similar operational procedures that the control engine 106 of the controller 104 follows based on certain conditions at a point in time.

For example, one or more protocols 132 can dictate an action that the control engine 106 takes when an object 160 is detected to move from one general location to another general location. Such protocols 132 can be for a particular object 160, a particular group of objects 160, or for all objects 160. A protocol 160 can be adjusted at different points in time. Such adjustments can be made, for example, by a user 150 (including an associated user system 155), by the network manager 180, by a WAC 185, and/or automatically by the control engine 106 based on evaluating actual results compared to expected results.

The protocols 132 can also include any of a number of communication protocols that are used to send and/or receive data between the controller 104 and a user 150 (including an associated user system 155), the network manager 180, one or more of the WACs 185, one or more of the sensor devices 165, any other applicable electrical devices 102-N, and one or more of the objects 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

Object data 134 can be any data associated with each object 160 that is communicably coupled to the controller 104. Such data can include, but is not limited to, a manufacturer of the object 160, a model number of the object 160, communication capability of an object 160, last known location of the object 160, and age of the object 160. The storage repository 130 can also store other types of data, including but not limited to user preferences, threshold values, default settings, tables, formulas, algorithms, forecasts, historical data, and models.

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132 and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with a user 150 (including an associated user system 155), the network manager 180, one or more of the WACs 185, one or more of the sensor devices 165, any other applicable electrical devices 102-N, and the objects 160 in the system 100. More specifically, the control engine 106 sends information to and/or receives information from the storage repository 130 in order to communicate with a user 150 (including an associated user system 155), the network manager 180, one or more of the WACs 185, one or more of the sensor devices 165, any other applicable electrical devices 102-N, and the objects 160. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the transceiver 124) of the controller 104. For example, the control engine 106 can put the communication module 108 in "sleep" mode when there are no communications between the controller 104 and another component (e.g., an object 160, a user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to receive, using one or more of the antennae 175, communication signals 195 from one or more objects 160 and/or other electrical devices 102-N in the system 100. This example provides another instance where the control engine 106 can conserve power used by the controller 104 and other components (e.g., the objects 160) of the system 100.

The control engine 106 can determine when to receive one or more communication signals 195 in an attempt to monitor the general location of an object 160. To conserve energy, the control engine 106 does not constantly receive communication signals 195, but rather only does so at discrete times. The control engine 106 can be active to receive a communication signal 195 based on one or more of a number of factors, including but not limited to passage of time, the occurrence of an event, instructions from a user 150 (including an associated user system 155), and a command received from the network manager 180.

The control engine 106 of the controller 104 can also determine when a communication signal 195 that is received should be ignored. For example, if a communication signal 195 is addressable, then the control engine 106 can determine if the communication signal 195 is addressed to the electrical device 102-1. If so, the control engine 106 determines the contents of the communication signal 195 and takes any appropriate action using the contents. If not, then the control engine 106 ignores the communication signal 195. In some cases, when the system 100 includes multiple electrical devices 102, each electrical device 102 can have some form of a controller 104. The control engine 106 of one controller 104 can coordinate with the controllers 104 of one or more of the other electrical devices 102-N. The control engine 106 can operate one or more optional switches 145 to accomplish its function.

In some cases, the control engine 106 of the electrical device 102-1 can monitor the location of an object 160 based on one or more communication signals 195 sent by (e.g., originated from, reflected off of) the object 160. In some cases, the communication signals 195 sent by an object 160 are in response to one or more communication signals 195 broadcast by one or more electrical devices 102. To accomplish this, the control engine 106 obtains a communication signal 195 (e.g., directly from the antennae 175) broadcast by the object 160 and/or reflected from the object 160.

The control engine 106 can generate and maintain one or more tables to track communications received from the communication devices 190 of one or more objects 160. These tables can include, for example, an identification of the objects 160 (or associated communication devices 190) and the time associated with those communications. The information in these tables can be sent to another controller (e.g., with one of the other electrical device 102-N, with a WAC 185, with the network manager 180), where this information can be used in coordination with other tables generated and maintained by one or more other controllers in the system 100 to identify the location and movement of each object 160 in the system 100.

The protocols 132 and/or algorithms used by the control engine 106 can dictate when and how the control engine 106 operates the optional switch 145. The protocols 132 and/or algorithms can also be used by the control engine 106 to determine which communication signals 195, if any, to ignore. These protocols 132 and/or algorithms can also be used by the control engine 106 to determine how often information in a table should be sent and the recipient of those communications.

The control engine 106 can provide control, communication, communication signals 195, and/or other signals to a user 150 (including an associated user system 155), the network manager 180, one or more of the WACs 185, one or more of the sensor devices 165, one or more other electrical devices 102-N, and one or more of the objects 160. Similarly, the control engine 106 can receive control, communication, communication signals 195, and/or other signals from a user 150 (including an associated user system 155), the network manager 180, one or more of the WACs 185, one or more of the sensor devices 165, one or more other electrical devices 102-N, and one or more of the objects 160. The control engine 106 can communicate with each object 160 (including the associated communication device 190) automatically (for example, based on one or more algorithms stored in the storage repository 130) and/or based on control, communication, and/or other similar signals received from another device (e.g., the network manager 180) using the communication signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, and if the electrical device 102-1 is a light fixture, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and the users 150 (including the associated user systems 155), the network manager 180, the WACs 185, the sensor devices 165, any other applicable electrical devices 102-N, and the objects 160 (including the associated communication devices 190).

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

Using example embodiments, while at least a portion (e.g., the control engine 106, the timer 110) of the controller 104 is always on, the remainder of the controller 104, the WACs 185, the sensor devices 165, the other electrical devices 102-N, and/or the objects 160 can be in sleep mode when they are not being used. In addition, the controller 104 can control certain aspects (e.g., sending communication signals 195 to and/or receiving communication signals 195 from an object 160, operating an optional switch 145) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the users 150 (including the associated user systems 155), the network manager 180, the WACs 185, the sensor devices 165, the objects 160 (including the associated communication devices 190), and any other applicable electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) the users 150 (including the associated user systems 155), the network manager 180, the WACs 185, the sensor devices 165, any other applicable electrical devices 102-N, and/or one or more of the objects 160 (including the associated communication devices 190). In some cases, the communication module 108 accesses the object data 134 to determine which communication protocol is within the capability of the communication device 190 of an object 160 for a communication signal 195 sent by the control engine 106. In addition, the communication module 108 can interpret the communication protocol of a communication (e.g., a communication signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to one or more other components (e.g., the power supply 140, a sensor device 165) of the electrical device 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from the power supply 140 and/or a source external to the electrical device 102-1 and generates power of a type (e.g., alternating current, direct current) and level (e.g., 12V, 24V, 120V) that can be used by the other components of the controller 104 and/or by one or more other components of the electrical device 102-1. In addition, or in the alternative, the power module 112 can be or include a source of power in itself to provide signals to the other components of the controller 104 and/or other components of the electrical device 102-1. For example, the power module 112 can include a battery. As another example, the power module 112 can include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the users 150 (including the associated user systems 155), the network manager 180, the WACs 185, the sensor devices 165, any of the objects 160 (including the associated communication devices 190), and/or any other applicable electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals, including communication signals 195. Specifically, the transceiver 124 can be used to transfer data between the controller 104 the users 150 (including the associated user systems 155), the network manager 180, any other applicable electrical devices 102-N, the WACs 185, the sensor devices 165, and/or the objects 160 (including the associated communication devices 190). The transceiver 124 can use wired and/or wireless technology. The transceiver 124 can be configured in such a way that the control and/or communication signals sent and/or received by the transceiver 124 can be received and/or sent by another transceiver that is part of the users 150 (including the associated user systems 155), the network manager 180, any other applicable electrical devices 102-N, the WACs 185, the sensor devices 165, and/or the objects 160 (including the associated communication devices 190).

When the transceiver 124 uses wireless technology, any type of wireless technology can be used by the transceiver 124 in sending and/or receiving signals. Such wireless technology can include, but is not limited to, Wi-Fi, visible light communication, cellular networking, BLE, and Bluetooth. The transceiver 124 can use one or more of any number of suitable communication protocols (e.g., ISA100, HART) when sending and/or receiving signals, including communication signals 195. Such communication protocols can be stored in the protocols 132 of the storage repository 130. Further, any transceiver information for the user system 155 of a user 150, the network manager 180, the WACs 185, the sensor devices 165, any other applicable electrical devices 102-N, and/or the communication device 190 of an object 160 can be part of the object data 134 (or similar areas) of the storage repository 130.

Optionally, in one or more example embodiments, the security module 128 secures interactions between the controller 104, a user 150 (including the associated user systems 155), the network manager 180, the WACs 185, the sensor devices 165, any other applicable electrical devices 102-N, and/or the objects 160 (including the associated communication devices 190). More specifically, the security module 128 authenticates communication from software based on security keys verifying the identity of the source of the communication. For example, user software may be associated with a security key enabling the software of the user system 155 of a user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more optional antennae 175, an optional switch 145, one or more sensor devices 165, and one or more electrical device components 142. The electrical device components 142 of the electrical device 102 are devices and/or components that are found in the electrical device 142 and/or are used to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to the controller 104, one or more of the optional antennae 175, the optional switch 145, one or more of the sensor devices 165, and/or one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102-1. In addition, or in the alternative, the power supply 140 can be a source of power in itself. For example, the power supply 140 can include a battery, a localized photovoltaic power system, or some other source of independent power.

As discussed above, the electrical device 102-1 includes one or more optional antennae 175. An antenna 175 is an electrical device that converts electrical power to communication signals 195 (for transmitting) and communication signals 195 to electrical power (for receiving). In transmission, a radio transmitter (e.g., transceiver 124) supplies, through the optional switch 145, an electric current oscillating at radio frequency (i.e. a high frequency alternating current (AC)) to the terminals of the antenna 175, and the antenna radiates the energy from the current as communication signals 195. In reception, an antenna 175 intercepts some of the power of communication signals 195 in order to produce a tiny voltage at its terminals, that is applied through the switch 145 to a receiver (e.g., transceiver 124) to be amplified.

An optional antenna 175 can typically consist of an arrangement of electrical conductors that are electrically connected to each other (often through a transmission line) to create a body of the antenna 175. The body of the antenna 175 can be electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse communication signal 195 (often an electromagnetic field wave). Conversely, during reception, the oscillating electric and magnetic fields of an incoming communication signal 195 exert force on the electrons in the body of the antenna 175, causing portions of the body of the antenna 175 to move back and forth, creating oscillating currents in the antenna 175.

In certain example embodiments, an optional antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

An antenna 175 can be electrically coupled to the optional switch 145, which in turn is electrically coupled to the transceiver 124. Without the switch 145, an antenna 175 is directly electrically coupled to the transceiver 124. The optional switch 145 can be a single switch device or a number of switch devices arranged in series and/or in parallel with each other. The switch 145 determines which antenna 175 (in the case of multiple antennae 175) or when the lone antenna 175 is coupled to the transceiver 124 at any particular point in time. A switch 145 can have one or more contacts, where each contact has an open state and a closed state (position). In the open state, a contact of the switch 145 creates an open circuit, which prevents the transceiver 124 from delivering a communication signal 195 to or receiving a communication signal 195 from the antenna 175 electrically coupled to that contact of the switch 145. In the closed state, a contact of the switch 145 creates a closed circuit, which allows the transceiver 124 to deliver a communication signal 195 to or receive a communication signal 195 from the antenna 175 electrically coupled to that contact of the switch 145. In certain example embodiments, the position of each contact of the optional switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Each of the one or more sensor devices 165 of the electrical device 102-1 can include one or more of any type of sensor that measures one or more parameters. Examples of types of sensors of a sensor device 165 can include, but are not limited to, a passive infrared sensor, a photocell, a pressure sensor, an air flow monitor, a gas detector, and a resistance temperature detector. Examples of a parameter that is measured by a sensor of a sensor device 165 can include, but are not limited to, occupancy in the volume of space 199, motion in the volume of space 199, a temperature, a level of gas, a level of humidity, an amount of ambient light in the volume of space 199, and a pressure wave. A sensor device 165 can have one sensor or multiple sensors.

In some cases, the parameter or parameters measured by a sensor of a sensor device 165 can be used to operate one or more of the electrical device components 142 of the electrical device 102-1. In addition, or in the alternative, the one or more parameters measured by a sensor of a sensor device 165 can be used to locate one or more objects 160 in accordance with certain example embodiments. For example, if a sensor device 165 is configured to detect the presence of an object 160 (including an associated communication device 190), that information can be used to determine whether a communication (e.g., a communication signal 195) received from a communication device 190 of an object 160 should be forwarded to the controller 104, a WAC 185, or the network manager 180.

In some cases, a sensor device 165 can be an integrated sensor device 165, which can be considered a type of electrical device 102. An integrated sensor device 165 has both the ability to sense and measure at least one parameter and the ability to independently communicate with another component (e.g., the communication device 190 of an object 160, a WAC 185, the controller 104 of the electrical device 102-1). The communication capability of an integrated sensor device 165 can include one or more communication devices that are configured to communicate with, for example, the controller 104 of the electrical device 102-1, a WAC 185, the network manager 180, another sensor device 165, and/or a controller (substantially similar to the controller 104 described herein) of another electrical device 102-N. For example, an integrated sensor device 165 can include a sensor that is a passive infrared (PIR) sensor, a transceiver that sends and receives signals (e.g., communication signals 195) using Zigbee, a receiver that receives signals (e.g., communication signals 195) using BLE, and a receiver that actively receives IR signals. In such a case, the PIR sensor measures IR light radiating from objects 160 in its field of view, often for the purpose of detecting motion.

Each integrated sensor device 165 can use one or more of a number of communication protocols. This allows an integrated sensor device 165 to communicate with one or more components (e.g., a communication device 190 of an object 160, the controller 104, a WAC 185, one or more other integrated sensor devices 165) of the system 100. The communication capability of an integrated sensor device 165 can be dedicated to the sensor device 165, shared with one or more other sensor devices 165 that are not integrated, and/or shared with the controller 104 of the electrical device 102-1. When the system 100 includes multiple integrated sensor devices 165, one integrated sensor device 165 can communicate, directly or indirectly, with one or more of the other integrated sensor devices 165 in the system 100.

If the communication capability of an integrated sensor device 165 is dedicated to the integrated sensor device 165, then the integrated sensor device 165 can include one or more components (e.g., memory 122, a storage repository 130, a transceiver 124, a communication module 108), or portions thereof, that are substantially similar to the corresponding components described above with respect to the controller 104. A sensor device 165 (whether integrated or not) can be associated with the electrical device 102-1 and/or another electrical device 102 in the system 100. A sensor device 165 (whether integrated or not) can be located within the housing 103 of the electrical device 102-1, disposed on the housing 103 of the electrical device 102-1, or located outside the housing 103 of the electrical device 102-1.

In certain example embodiments, a sensor device 165 (whether integrated or not) can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. The controller 104 can provide the functionality of these components used by the sensor device 165. Alternatively, the sensor device 165 can be integrated and include, either on its own or in shared responsibility with the controller 104, one or more of the components of the controller 104. In such a case, the integrated sensor device 165 can correspond to a computer system as described below with regard to FIG. 2. An example of an integrated sensor device is shown below with respect to FIG. 11.

Figure 2:
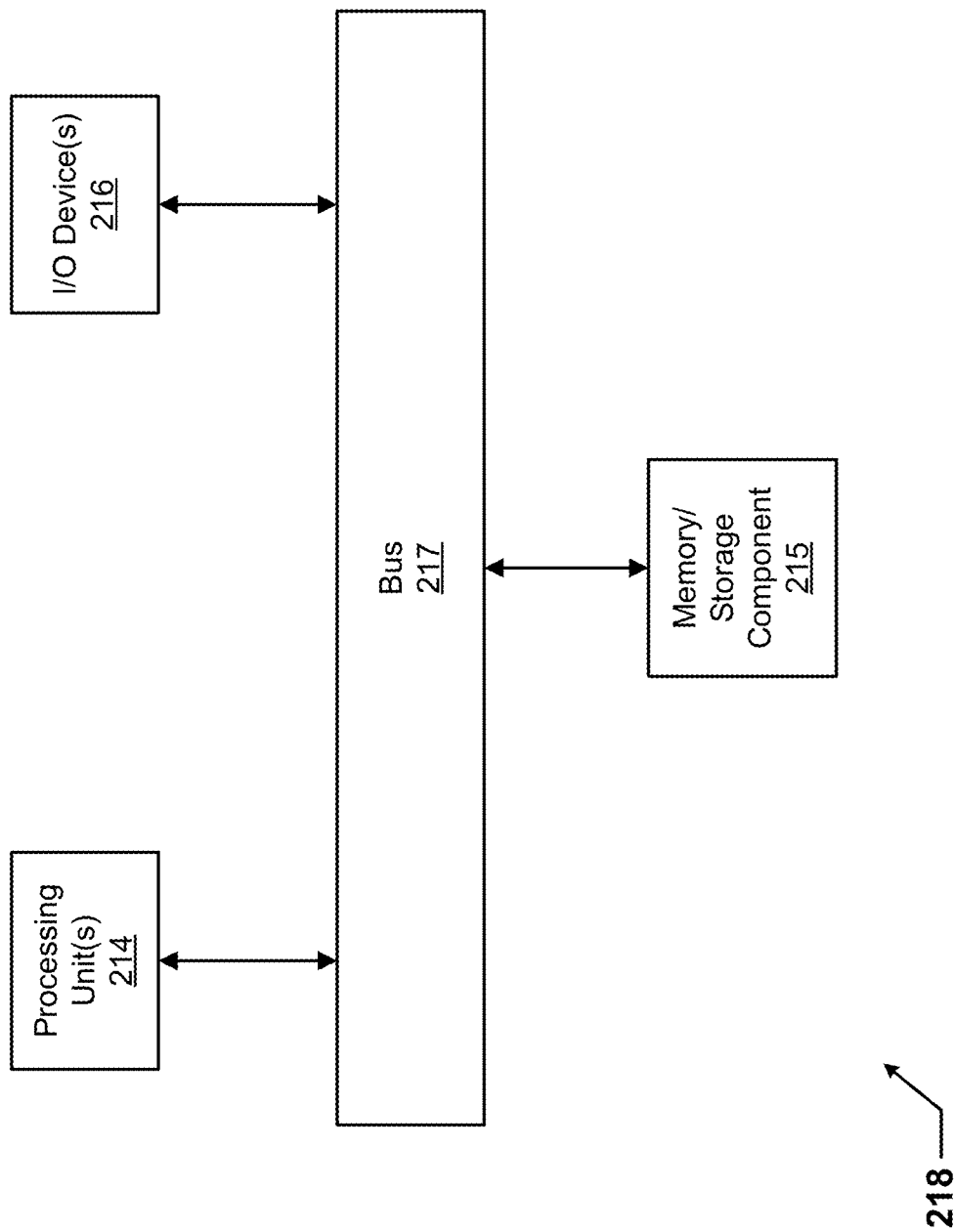
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
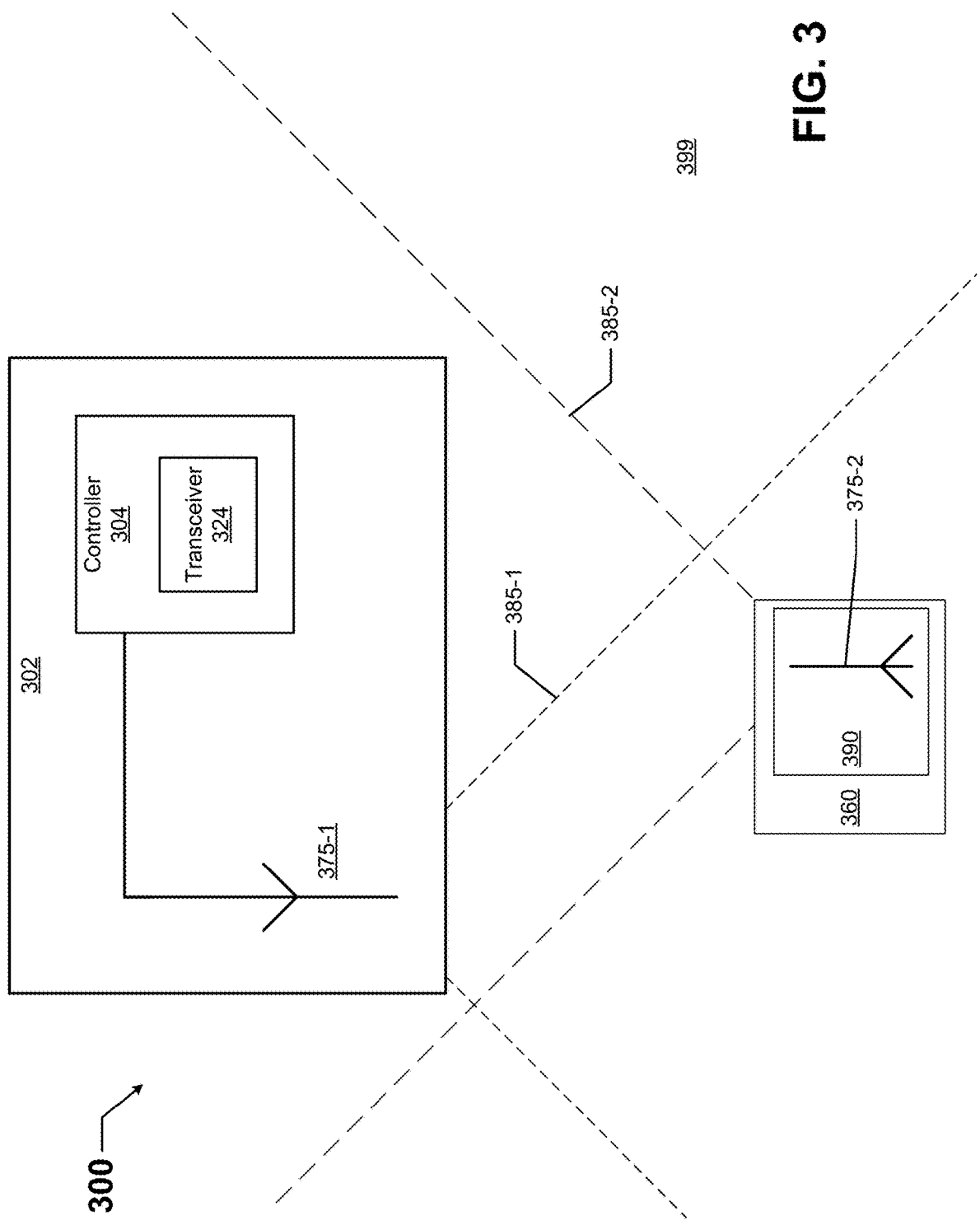
FIG. 3 shows a system in which an object is located in a volume of space in accordance with certain example embodiments.

FIG. 3 shows a system 300 to monitor the presence of an object 360 in a volume of space 399 in accordance with certain example embodiments. Referring to FIGS. 1 through 3, also located in the volume of space 399 of FIG. 3 is an electrical device 302 having a controller 304 (including a transceiver 324) and an antenna 375. As discussed above with respect to FIG. 1, the volume of space 399 can be of any size and/or in any location. For example, the volume of space 399 can be a room in an office building or a home.

As shown in FIG. 3, the antenna 375 of the electrical device 302 can be located in the volume of space 399. Alternatively, the antenna 375 can be located on another device (e.g., another light fixture, on a thermostat, on a clock/radio, on a television). In any case, it is possible that the antenna 375 can be located outside the volume of space 399, as long as the RF signals (e.g., communication signals 195) sent by the communication device 390 of the object 360 are received by the antenna 375 of the electrical device 302. The antenna 375, when combined with the transceiver 324 of the controller 304, has a communication range 385-1. The communication range 385-1 defines a maximum volume within the volume of space 399 in which the transceiver 324 can send and receive signals.

The object 360 of FIG. 3 includes a communication device 390, which can be substantially the same as the object 160 and the communication device 190 discussed above with respect to FIG. 1. For example, as shown in FIG. 3, the communication device 390 of FIG. 3 can include an antenna. In some cases, the communication device 390 can also include a controller, which can perform at least some of the capabilities of the controller 104 described above. In some cases, the communication device 390 of the object 360 can have a communication range 385-2, which defines a maximum volume within the volume of space 399 in which the communication device 390 can send and/or receive signals.

If the communication range 385-1 of the controller 304 of the electrical device 302 intersects with the communication range 385-2 of the communication device 390, then the controller 304 and the communication device 390 can transmit signals between each other. Conversely, if the communication range 385-1 of the controller 304 of the electrical device 302 fails to intersect the communication range 385-2 of the communication device 390, then the controller 304 and the communication device 390 fail to communicate with each other.

Figure 4:
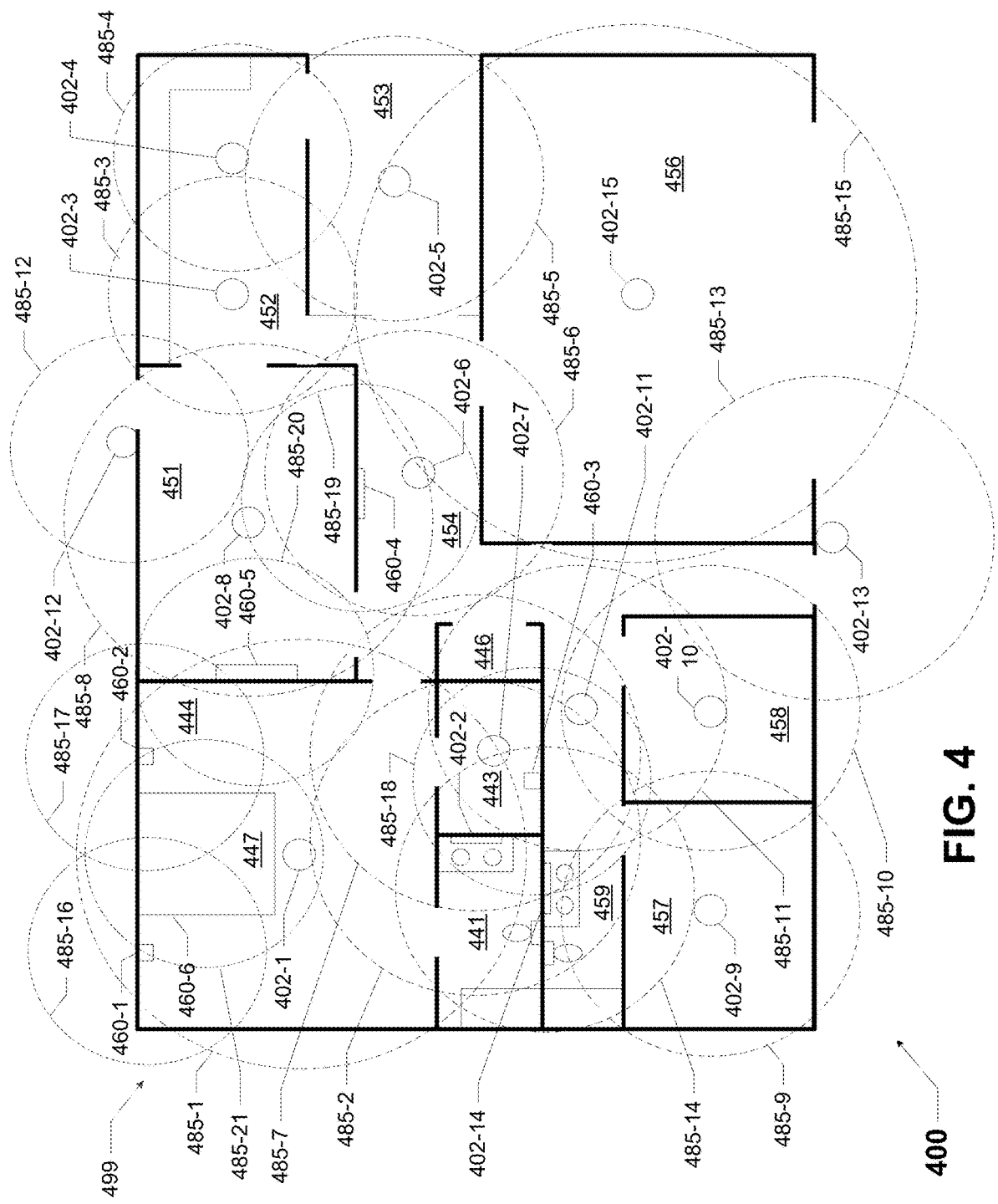
FIG. 4 shows a system of multiple electrical devices used to monitor the presence of an object in accordance with certain example embodiments.

FIG. 4 shows a system in which one or more electrical devices 402 are used to monitor the presence of a number of objects 460 in accordance with certain example embodiments can be used. Referring to FIGS. 1 through 4, the system 400 of FIG. 4 is set throughout a volume of space 499 in the form of a home. The volume of space 499 of FIG. 4 includes a family room 451, a kitchen 452, a dining room 453, a hallway/entryway 454, garage 456, a spare bedroom 457, another spare bedroom 458, a secondary bathroom 459, a laundry room 446, and a master bedroom 444 having a master bathroom 441 and a master closet 443. While each room of the volume of space 499 (in this case, the home) can have furniture and other objects disposed therein, most of those objects are not shown here for the sake of simplicity. The furniture shown in FIG. 4 includes a bed 447 in the master bedroom 444.

There are a number of objects 460 shown in FIG. 4 at various locations throughout the volume of space 499. Object 460-1 (e.g., a wallet, a set of keys) is located inside a nightstand on one side of the bed 447 in the master bedroom 444, and object 460-2 (e.g., jewelry) is located inside a nightstand on the other side of the bed 447 in the master bedroom 444. Object 460-3 (e.g., a safe) is located in the master closet 443. Object 460-4 (e.g., a painting) is hung on a wall in the hallway 454. Object 460-5 (e.g., a large-screen television, a soundbar) is located in the family room 451. Object 460-6 (e.g., more jewelry, important paperwork) is located under the bed 447 in the master bedroom 444. Object 460-6 can optionally be a person lying in the bed 447.

There are also a number of electrical devices 402 positioned throughout the volume of space 499. For example, as shown in FIG. 4, electrical device 402-1 is a combination ceiling fan and light fixture that is disposed on the ceiling at the approximate center of the master bedroom 444. Electrical device 402-2 is a vanity light mounted on a wall in the master bathroom 441. Electrical device 402-3 is a combination ceiling fan and light fixture that is disposed on the ceiling toward one end of the kitchen 452. Electrical device 402-4 is light that is disposed on the ceiling toward the opposite end of the kitchen 452 relative to electrical device 402-3.

Electrical device 402-5 is a light fixture that is disposed on the ceiling in the approximate center of the dining room 453. Electrical device 402-6 is a light fixture that is disposed on the ceiling in the hallway 454. Electrical device 402-7 is a light fixture that is disposed on the ceiling in the approximate center of the master closet 443. Electrical device 402-15 is a garage door opening unit that is disposed on the ceiling in the approximate center of the garage 456. Electrical device 402-9 is a combination ceiling fan and light fixture that is disposed on the ceiling in the approximate center of one of the bedrooms 457.

Electrical device 402-10 is a combination ceiling fan and light fixture that is disposed on the ceiling in the approximate center of one of the other bedrooms 458. Electrical device 402-11 is another light fixture that is disposed on the ceiling in a different part of the hallway 454 compared to where electrical device 402-6 is disposed. Electrical device 402-12 is a light fixture that is disposed on the exterior wall at the rear of the volume of space 499 outside the family room 451. Electrical device 402-13 is a light fixture that is disposed on the exterior wall at the front of the volume of space 499 outside the hallway/entryway 454. Electrical device 402-14 is a vanity light mounted on a wall in the bathroom 459. There can also be other electrical devices 402 in the volume of space 499 that are not shown in FIG. 4 to help simplify this example.

Each electrical device 402 of FIG. 4 is substantially similar to the electrical device 102-1 of FIG. 1, including its components such as the controller 104. Also, each object 460 of FIG. 4 (including the associated communication device, not shown to simplify FIG. 4) is substantially similar to the object 160 of FIG. 1, including its components such as the communication device 190. In other words, each electrical device 402 and each object 460 of FIG. 4 is capable of communicating with each other provided that they have overlapping communication ranges 485.

Electrical device 402-1 has communication range 485-1.
Electrical device 402-2 has communication range 485-2.
Electrical device 402-3 has communication range 485-3.
Electrical device 402-4 has communication range 485-4.
Electrical device 402-5 has communication range 485-5.
Electrical device 402-6 has communication range 485-6.
Electrical device 402-7 has communication range 485-7.
Electrical device 402-8 has communication range 485-8.
Electrical device 402-9 has communication range 485-9.
Electrical device 402-10 has communication range 485-10.
Electrical device 402-11 has communication range 485-11.
Electrical device 402-12 has communication range 485-12. Electrical device 402-13 has communication range 485-13. Electrical device 402-14 has communication range 485-14. Electrical device 402-15 has communication range 485-15. Object 460-1 (or, more precisely, the communication device of object 460-1) has communication range 485-16. Object 460-2 (or, more precisely, the communication device of object 460-2) has communication range 485-17. Object 460-3 (or, more precisely, the communication device of object 460-3) has communication range 485-18. Object 460-4 (or, more precisely, the communication device of object 460-4) has communication range 485-18. Object 460-5 (or, more precisely, the communication device of object 460-5) has communication range 485-20. Object 460-6 (or, more precisely, the communication device of object 460-6) has communication range 485-21.

In this case, communication range 485-1 of electrical device 485-1 overlaps with communication range 485-16 of object 460-1, communication range 485-17 of object 460-2, communication range 485-20 of object 460-5, communication range 485-21 of object 460-6, communication range 485-8 of electrical device 402-8, communication range 485-2 of electrical device 402-2, communication range 485-7 of electrical device 402-7, communication range 485-14 of electrical device 402-14, and communication range 485-11 of electrical device 402-11.

Communication range 485-2 of electrical device 485-2 overlaps with communication range 485-18 of object 460-3, communication range 485-20 of object 460-5, communication range 485-21 of object 460-6, communication range 485-1 of electrical device 402-1, communication range 485-7 of electrical device 402-7, communication range 485-9 of electrical device 402-9, communication range 485-10 of electrical device 402-10, communication range 485-11 of electrical device 402-11, and communication range 485-14 of electrical device 402-14.

Communication range 485-3 of electrical device 485-3 overlaps with communication range 485-4 of electrical device 402-4, communication range 485-5 of electrical device 402-5, communication range 485-6 of electrical device 402-6, communication range 485-8 of electrical device 402-8, communication range 485-12 of electrical device 402-12, and communication range 485-15 of electrical device 402-15. Communication range 485-4 of electrical device 485-4 overlaps with communication range 485-3 of electrical device 402-3 and communication range 485-5 of electrical device 402-5.

Communication range 485-5 of electrical device 485-5 overlaps with communication range 485-3 of electrical device 402-3, communication range 485-4 of electrical device 402-4, and communication range 485-15 of electrical device 402-15. Communication range 485-6 of electrical device 485-6 overlaps with communication range 485-19 of object 460-4, communication range 485-20 of object 460-5, communication range 485-3 of electrical device 402-3, communication range 485-7 of electrical device 402-7, communication range 485-8 of electrical device 402-8, communication range 485-11 of electrical device 402-11, and communication range 485-15 of electrical device 402-15.

Communication range 485-7 of electrical device 485-7 overlaps with communication range 485-18 of object 460-3, communication range 485-20 of object 460-5, communication range 485-1 of electrical device 402-1, communication range 485-2 of electrical device 402-2, communication range 485-6 of electrical device 402-6, communication range 485-8 of electrical device 402-8, communication range 485-9 of electrical device 402-9, communication range 485-10 of electrical device 402-10, communication range 485-11 of electrical device 402-11, and communication range 485-14 of electrical device 402-14.

Communication range 485-8 of electrical device 485-8 overlaps with communication range 485-17 of object 460-2, communication range 485-19 of object 460-4, communication range 485-20 of object 460-5, communication range 485-1 of electrical device 402-1, communication range 485-3 of electrical device 402-3, communication range 485-6 of electrical device 402-6, communication range 485-6 of electrical device 402-6, communication range 485-7 of electrical device 402-7, and communication range 485-15 of electrical device 402-15.

Communication range 485-9 of electrical device 485-9 overlaps with communication range 485-18 of object 460-3, communication range 485-2 of electrical device 402-2, communication range 485-7 of electrical device 402-7, communication range 485-10 of electrical device 402-10, communication range 485-11 of electrical device 402-11, and communication range 485-14 of electrical device 402-14. Communication range 485-10 of electrical device 485-10 overlaps with communication range 485-18 of object 460-3, communication range 485-2 of electrical device 402-2, communication range 485-7 of electrical device 402-7, communication range 485-10 of electrical device 402-10, communication range 485-11 of electrical device 402-11, and communication range 485-13 of electrical device 402-13, communication range 485-14 of electrical device 402-14.

Communication range 485-11 of electrical device 485-11 overlaps with communication range 485-18 of object 460-3, communication range 485-2 of electrical device 402-2, communication range 485-6 of electrical device 402-6, communication range 485-7 of electrical device 402-7, communication range 485-10 of electrical device 402-10, communication range 485-11 of electrical device 402-11, and communication range 485-13 of electrical device 402-13, communication range 485-14 of electrical device 402-14.

Communication range 485-12 of electrical device 485-12 overlaps with communication range 485-19 of object 460-4, communication range 485-3 of electrical device 402-3, and communication range 485-12 of electrical device 402-12. Communication range 485-13 of electrical device 485-13 overlaps with communication range 485-10 of electrical device 402-10, communication range 485-11 of electrical device 402-11, and communication range 485-15 of electrical device 402-15.

Communication range 485-14 of electrical device 485-14 overlaps with communication range 485-18 of object 460-3, communication range 485-1 of electrical device 402-1, communication range 485-2 of electrical device 402-2, communication range 485-7 of electrical device 402-7, communication range 485-9 of electrical device 402-9, communication range 485-10 of electrical device 402-10, and communication range 485-11 of electrical device 402-11.

Communication range 485-15 of electrical device 485-15 overlaps with communication range 485-19 of object 460-4, communication range 485-3 of electrical device 402-3, communication range 485-5 of electrical device 402-5, communication range 485-6 of electrical device 402-6, communication range 485-8 of electrical device 402-8, and communication range 485-13 of electrical device 402-13. Communication range 485-16 of object 460-1 overlaps with communication range 485-17 of object 460-2, communication range 485-21 of object 460-6, and communication range 485-1 of electrical device 402-1.

Communication range 485-17 of object 460-2 overlaps with communication range 485-16 of object 460-1, communication range 485-20 of object 460-5, communication range 485-21 of object 460-6, communication range 485-1 of electrical device 402-1, and communication range 485-8 of electrical device 402-8. Communication range 485-18 of object 460-3 overlaps with communication range 485-1 of electrical device 402-1, communication range 485-2 of electrical device 402-2, communication range 485-7 of electrical device 402-7, communication range 485-9 of electrical device 402-9, communication range 485-10 of electrical device 402-10, communication range 485-11 of electrical device 402-11, and communication range 485-14 of electrical device 402-14.

Communication range 485-19 of object 460-4 overlaps with communication range 485-20 of object 460-5, communication range 485-6 of electrical device 402-6, communication range 485-8 of electrical device 402-8, communication range 485-12 of electrical device 402-12, and communication range 485-15 of electrical device 402-15. Communication range 485-20 of object 460-5 overlaps with communication range 485-17 of object 460-2, communication range 485-19 of object 460-4, communication range 485-21 of object 460-6, communication range 485-1 of electrical device 402-1, communication range 485-2 of electrical device 402-2, communication range 485-6 of electrical device 402-6, communication range 485-7 of electrical device 402-7, and communication range 485-8 of electrical device 402-8.

Communication range 485-21 of object 460-6 overlaps with communication range 485-16 of object 460-1, communication range 485-17 of object 460-2, communication range 485-20 of object 460-5, communication range 485-1 of electrical device 402-1, and communication range 485-2 of electrical device 402-2. The communication range 485 or an electrical device 402 and/or an object 460 in FIG. 4 can be made larger or smaller, and these adjustments can be made, for example, manually by a user (e.g., user 150), by the network manager (e.g., network manager 180), by a WAC (e.g., WAC 185), or automatically by a controller (e.g., controller 104).

Given the relative orientation of the electrical devices 402 and objects 460 in FIG. 4, the objects 460 can be monitored. Specifically, the electrical devices 402 form a communication network (in this case, a mesh network) so that each electrical device 402 is in direct communication with at least one other electrical device 402, and the communication ranges 485 of all of the electrical devices 402 covers essentially the entire volume of space 499 so that objects 460 in the home can be identified and monitored, regardless of where they are located.

Example embodiments are not concerned with determining the precise location of the objects 460 in the volume of space 499. The ability to determine the precise location of on object 460 requires significant processing power, which increases costs and consumes valuable bandwidth. By contrast, example embodiments require relatively very little processing power, thereby reducing cost and operating efficiency. Here, the presence of an object 460 is determined without necessarily knowing which room in the volume of space 499 the object 460 is located, let alone the particular location within a room.

In the case of what is shown in FIG. 4, the presence of object 460-1, object 460-2, and object 460-6 is identified and monitored by electrical device 402-1. The presence of object 460-3 is identified and monitored by electrical device 402-1, electrical device 402-2, electrical device 402-7, electrical device 402-9, electrical device 402-10, and electrical device 402-14. The presence of object 460-4 is identified and monitored by electrical device 402-7, electrical device 402-8, and electrical device 402-12. The presence of object 460-5 is identified and monitored by electrical device 402-1, electrical device 402-2, electrical device 402-6, electrical device 402-7, and electrical device 402-8.

As an example of how identifying and monitoring the presence of an object 460 can be used, if a user (e.g., user 150) misplaces object 406-1 (e.g., a set of keys), the user can ask (e.g., using an app on a user system 155) a component (e.g., the network manager 180, an electrical device 402) of the system 400 to determine approximately where (e.g., which room) in the volume of space 499 the object 460-1 is located. This request can be made directly by the user or indirectly through a user device. A component (e.g., the network manager 180, an electrical device 402) of the system 400 can poll all of the electrical devices 402 and determine which of the electrical devices 402 detect the presence of the object 460-1. The system 400 can then notify, based on which of the electrical devices 402 currently identify the object 460-1, the approximate location (in this case, the master bedroom 444) of the object 460-1.

Example embodiments can also be used in other situations and scenarios. For example, if one or more of the objects 460 are valuable, example embodiments can be used to automatically notify a user when the object 460 is moved and/or removed from the volume of space 499. As a specific example, example embodiments can be used to notify a user, in real time, when a burglar or other unauthorized person is in the process of stealing one or more valuable objects 460 from the volume of space 499. As another example, as discussed below, in cases where an object 460 is a person (e.g., an infant, a child who is grounded, an elderly person with dementia), example embodiments can be used to notify a user (e.g., a parent, a caregiver) when the person moves to another room and/or leaves the volume of space 499. Other use examples of the embodiments described herein are expressed below.

Example embodiments can also be used in conjunction with a security system, as shown in FIGS. 5 through 8. Referring to FIGS. 1 through 8, FIGS. 5 through 8 show a portion of the volume of space 499 of FIG. 4 to illustrate an example of how an object 460 (in this case, object 460-3, which is a small safe and its contents) can be identified and monitored using example embodiments. Specifically, FIGS. 5 through 8 show the master bedroom 444, the master bathroom 441, the closet 443, the hallway 454, the laundry room 446, and the family room 451, as well as all of the objects 460 (specifically, object 460-1, object 460-2, object 460-3, object 460-4, object 460-5, and object 460-6) and all of the electrical devices 402 (specifically, electrical device 402-1, electrical device 402-2, electrical device 402-6, electrical device 402-7, electrical device 402-8, and electrical device 402-11) in those rooms as shown in FIG. 4.

Electrical device 402-1 has communication range 485-1. Electrical device 402-2 has communication range 485-2. Electrical device 402-6 has communication range 485-6. Electrical device 402-7 has communication range 485-7. Electrical device 402-8 has communication range 485-8. Electrical device 402-11 has communication range 485-11. Object 460-1 has communication range 485-16. Object 460-2 has communication range 485-17. Object 460-3 has communication range 485-18. Object 460-4 has communication range 485-18. Object 460-5 has communication range 485-20. Object 460-6 has communication range 485-21. The size of each of these communication ranges 485 is substantially the same as what is shown in FIG. 4, and the position of each object 460 and electrical device 402 is the same as what is shown in FIG. 4, with the exception of the location of object 460-3 and its corresponding communication range 485-18. Specifically, object 460-3 is now located in the master bedroom 444 instead of the closet 443.

In addition to what is shown in FIG. 4, FIGS. 5 through 8 show a network manager 580 in the closet 443, where the network manager 580 has a communication range 585-1. The network manager 580 of FIG. 5 can be substantially the same as the network manager 180 described above with respect to FIG. 1. The communication range 585-1 of the network manager 580 intersects the communication range 485-1 of electrical device 402-1, communication range 485-2 of electrical device 402-2, communication range 485-7 of electrical device 402-7, communication range 485-11 of electrical device 402-11, and communication range 485-18 of object 460-3. Because of the relatively small number of electrical devices 406 in the systems of FIGS. 5 through 8, there is no WAC (e.g., WAC 185).

Figure 5:
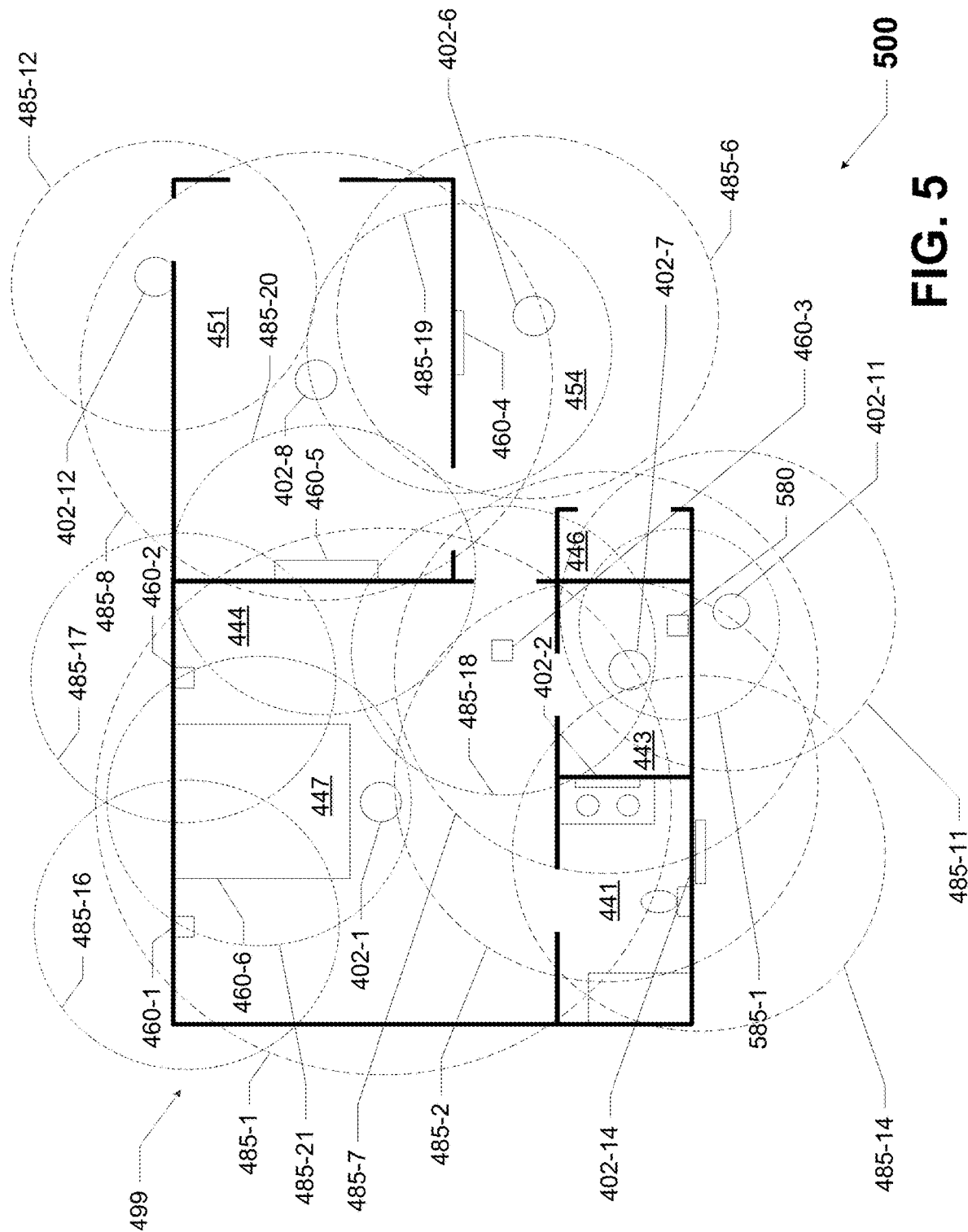
FIGS. 5-8 show a system of multiple electrical devices used to monitor the presence of an object in accordance with certain example embodiments.

As stated above, in the system 500 of FIG. 5, object 460-3 is moved out of the closet 443 into the master bedroom 444. When this occurs, the communication range 485-16 moves with the object 460-3, which can cause the object 460-3 to stop direct communication with some electrical devices 402 and/or objects 460 while initiating direct communication with some other electrical devices 402 and/or objects 460. In this case, moving the object 460-3 to the master bedroom 444 keeps the object 460-3 in direct communication with communication range 485-1 of electrical device 402-1, communication range 485-2 of electrical device 402-2, communication range 485-7 of electrical device 402-7, communication range 485-9 of electrical device 402-9, communication range 485-10 of electrical device 402-10, communication range 485-11 of electrical device 402-11, communication range 485-14 of electrical device 402-14, and communication range 585 of the network manager 580.

In addition, moving the object 460-3 to the master bedroom 444 causes the object 460-3 to be in direct communication with communication range 485-8 of electrical device 402-8, communication range 485-20 of object 460-5, and communication range 485-21 of object 460-6. In some cases, when this movement of object 460-3 from the closet 443 to the master bedroom 444 occurs, the network manager 580 receives, directly or indirectly, communications from object 460-5 and object 460-6 that they are now in direct communication with object 460-3.

With this information, combined with other direct or indirect communications received from electrical device 402-1, electrical device 402-2, electrical device 402-7, electrical device 402-9, electrical device 402-10, electrical device 402-11, and electrical device 402-14 that those electrical devices 460 remain in direct communication with object 460-3, the network manager 580 can determine that object 460-3 has been moved into the master bedroom 444 from the closet 443. These communications can occur in real time so that the network manager 580 can monitor the general movement of object 460-3 in real time.

Figure 6:
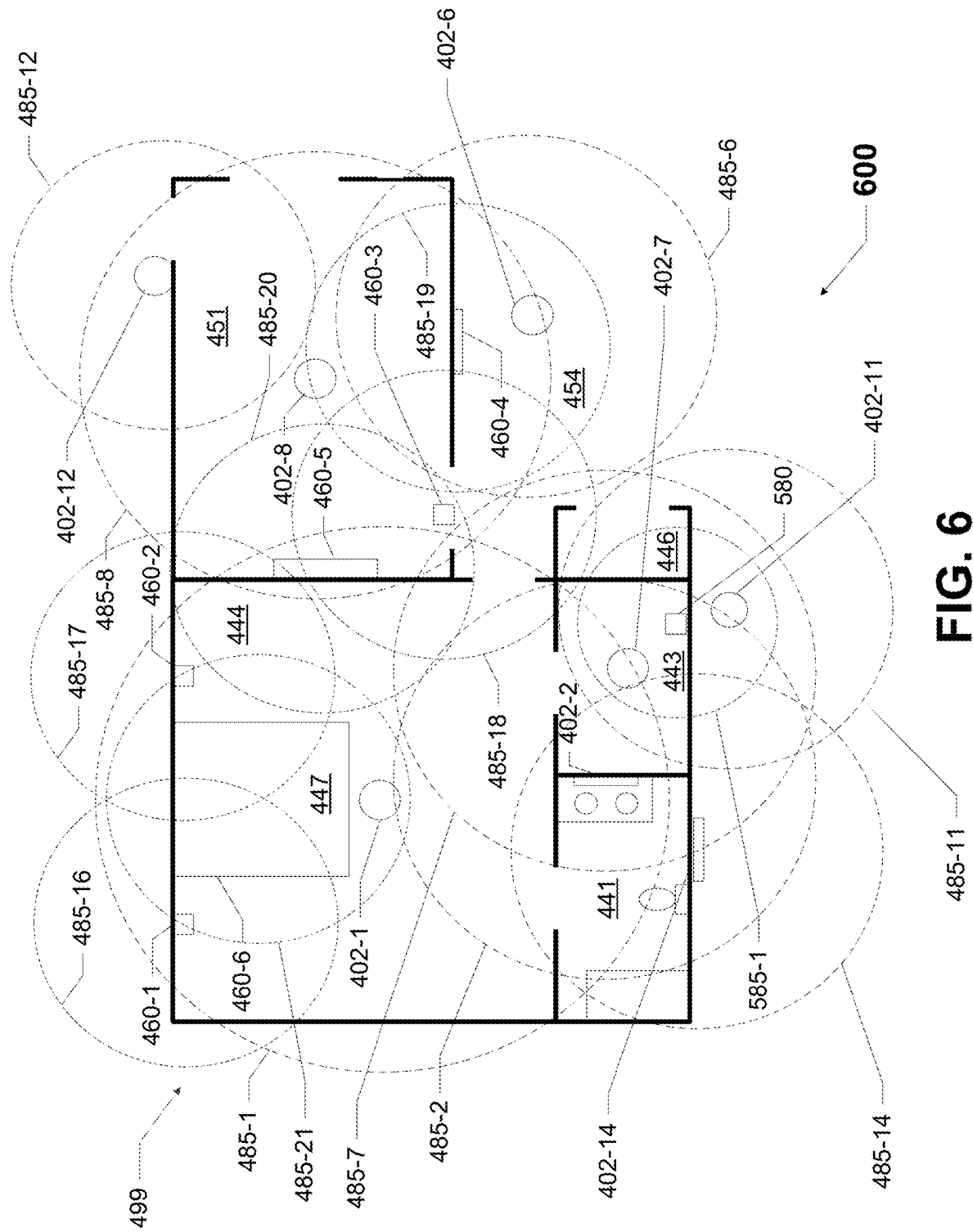

The system 600 of FIG. 6 is substantially the same as the system 500 of FIG. 5, except as described below. Specifically, object 460-3 is moved out of the master bedroom 444 into the entry from the hallway 454 to the family room 451. When this occurs, the communication range 485-16 moves with the object 460-3, which in this case causes the object 460-3 to stop direct communication with the network manager 580, electrical device 402-14, and object 460-6, and to begin direct communication with electrical device 402-6 and object 460-4. As a result, the network manager 580 receives direct or indirect communications from electrical device 402-1, electrical device 402-2, electrical device 402-7, electrical device 402-6, electrical device 402-8, electrical device 402-9, electrical device 402-10, and electrical device 402-11 that those electrical devices 460 are in direct communication with object 460-3.

The network manager 580 also receives direct or indirect communications from object 460-4, object 460-5, and object 460-6 that those objects 460 are now in direct communication with object 460-3. With this information, the network manager 580 can determine that object 460-3 has been moved from the master bedroom 444 almost into the family room 451. The network manager 580 may take one or more actions, based on one or more protocols (e.g., protocol 132), at this time. For example, the network manager 580 may cause a voice recording to sound through speakers in the family room 451 that the object 460-3 should be returned to the master bedroom 444 or the closet 443. The network manager 580 can also activate all cameras and recording devices (types of electrical devices 402) within the volume of space 499 to capture footage during this time.

Figure 7:
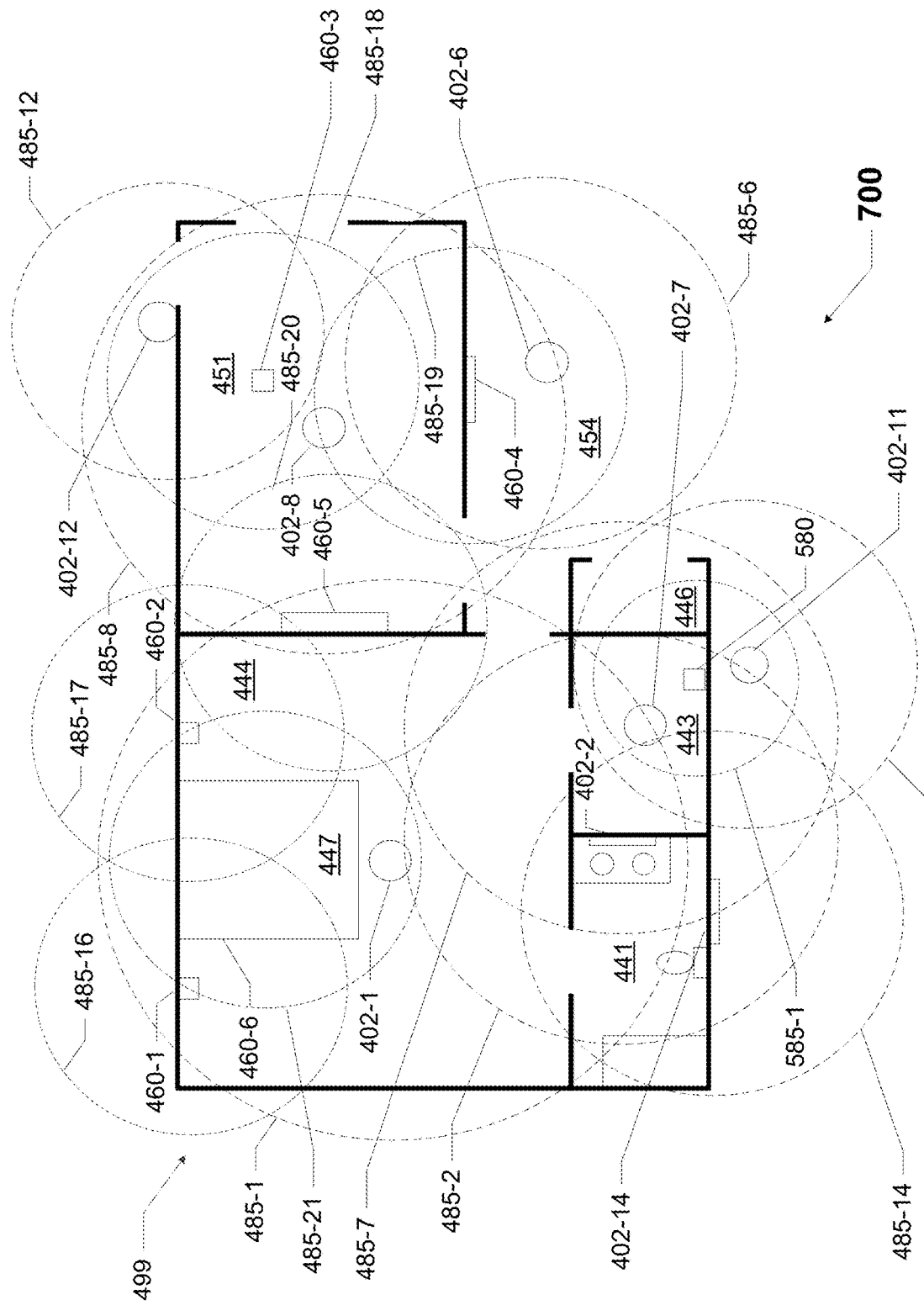

The system 700 of FIG. 7 is substantially the same as the system 600 of FIG. 6, except as described below. Specifically, object 460-3 is moved toward the back door in the family room 451. When this occurs, the communication range 485-16 moves with the object 460-3, which in this case causes the object 460-3 to stop direct communication with electrical device 402-1, electrical device 402-2, electrical device 402-7, and electrical device 402-11, and to begin direct communication with electrical device 402-12. As a result, the network manager 580 receives direct or indirect communications from electrical device 402-6, electrical device 402-8, electrical device 402-9, electrical device 402-10, electrical device 402-12, and electrical device 402-14 that those electrical devices 402 are now in direct communication with object 460-3.

The network manager 580 also receives direct or indirect communications from object 460-4, object 460-5, and object 460-6 that those objects 460 are now in direct communication with object 460-3. With this information, the network manager 580 can determine that object 460-3 is being moved toward the rear exit of the volume of space 499 in the family room 451. The network manager 580 may take one or more actions, based on one or more protocols (e.g., protocol 132), at this time. For example, the network manager 580 may turn on all light fixtures (types of electrical devices 402) in the volume of space 499 and repeat the voice recording to sound through speakers in the family room 451 that the object 460-3 should be returned to the master bedroom 444 or the closet 443 immediately or the police will be called. The network manager 580 can also continue to have all cameras and recording devices remain active. To the extent that a position of the camera can be adjusted remotely, the network manager 580 can direct the camera toward the general position of object 460-3.

Figure 8:
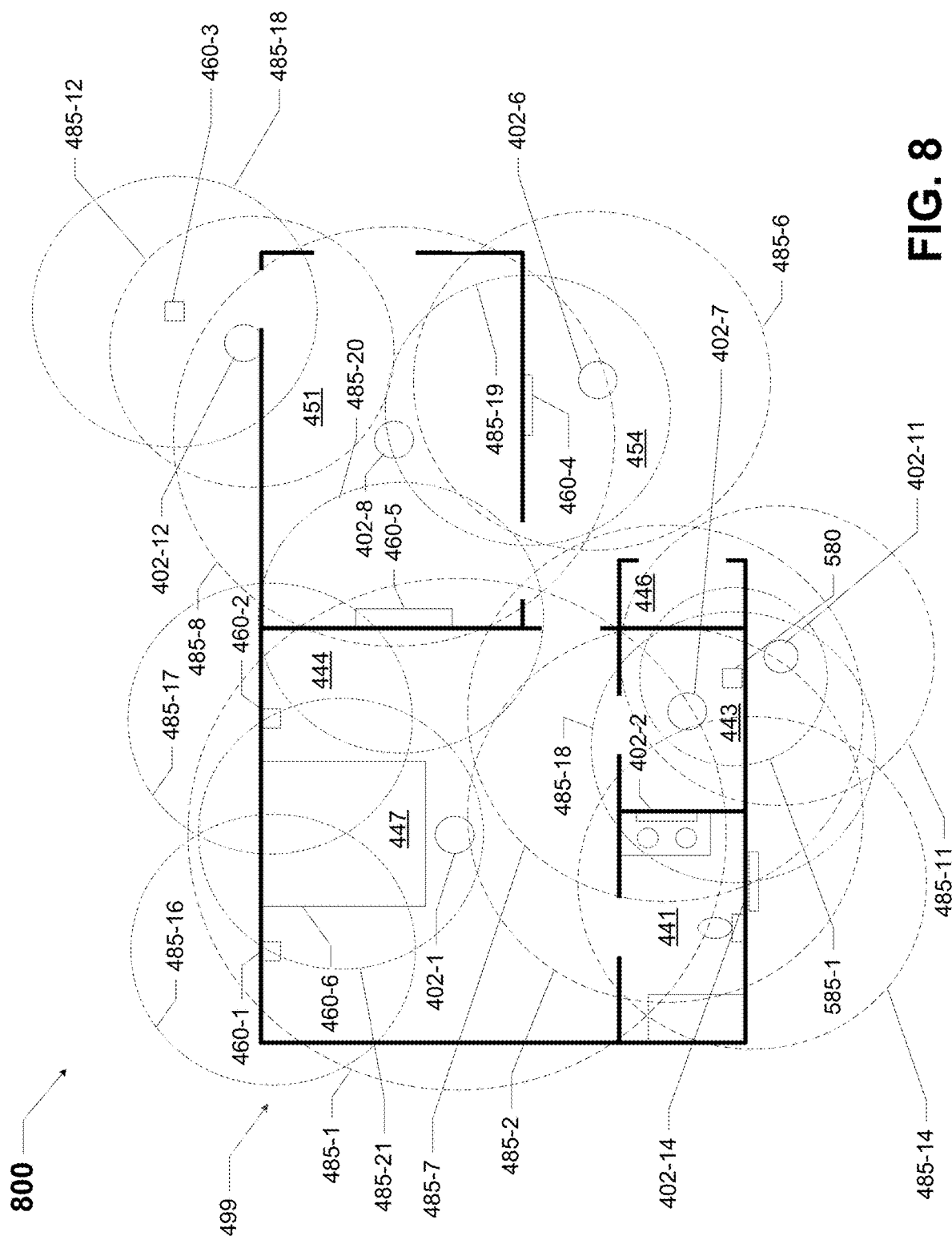

The system 800 of FIG. 8 is substantially the same as the system 700 of FIG. 7, except as described below. Specifically, object 460-3 is moved through the back door in the family room 451 into the back yard. When this occurs, the communication range 485-16 moves with the object 460-3, which in this case causes the object 460-3 to stop direct communication with electrical device 402-6, electrical device 402-9, electrical device 402-10, electrical device 402-14, object 460-4, object 460-5, and object 460-6. The movement of object 460-3 outside does not generate any additional direct communication with the electrical devices 402 or objects 460. As a result, the network manager 580 receives indirect communications from electrical device 402-8 and electrical device 402-12 that those electrical devices 402 are now in direct communication with object 460-3.

The network manager 580 also fails to receive any direct or indirect communications that any of the other objects 460 are now in direct communication with object 460-3. With this information, the network manager 580 can determine that object 460-3 has been removed from the volume of space 499 through the rear door in the family room 451. The network manager 580 may take one or more actions, based on one or more protocols (e.g., protocol 132), at this time. For example, the network manager 580 may call 911 to report a robbery in progress and sound loud alarms through speakers (types of electrical devices 402) in the volume of space 499. In addition, the network manager may keep all light fixtures in the volume of space 499 on, turn off the voice recording to sound through speakers in the family room 451 that the object 460-3 should be returned to the master bedroom 444 or the closet 443. The network manager 580 can also continue to have all cameras and recording devices remain active.

As discussed above, an object 460 can also be a person. In such a case, a person can wear (e.g., on clothing) a beacon (e.g., a Tile®, which is a registered trademark of Tile, Inc. of Delaware) or other type of communication device so that the general location of the person can be monitored. Alternatively, a person can otherwise have in his/her possession a communication device (e.g., communication device 190) in some other form (e.g., an app on a cell phone, an identification card, a chip embedded under the skin). In some cases where the object 460 is a person, the communication device (e.g., communication device 190) and the user system (e.g., user system 155) of the object 460 (e.g., a user 150) can be the same system or device. Example embodiments can be especially useful in cases where such a person is an infant, where such a person is subject to confinement (e.g., a person under house arrest, a child who is grounded), or where such a person is suffering from dementia, alzheimer's disease, or some other condition that can subject the person to danger when leaving the volume of space 499 unsupervised or unescorted. Using example embodiments, the network manager 580 or other component of the system 400 can implement similar actions and/or other actions relative to what is described in the example of FIGS. 5 through 8 to keep the person in the house and out of danger.

Example embodiments can also be incorporated with and/or triggered by an external event. For instance, the controller of one or more electrical devices 402 and/or the network manager 580 can be notified, through the communication network (e.g., BLE) of the system, when a 911 or other emergency call is dialed. In such a case, an electrical device 402 (e.g., a cell phone, a voice-activated control device) can detect a number dialed and/or particular words spoken to determine that an emergency situation is occurring. The example system can respond, for example, by immediately turning on all light fixtures to the highest light level and start recording video (to the extent that such capability exists with one or more of the electrical devices 402 in and/or adjacent to the volume of space 499). Similarly, such a function could be accomplished with a panic button built into an electrical device 402 or as a stand-alone electrical device 402 as a manual trigger outside of dialing 911 or some other emergency number on a phone.

As stated, above, any electrical device in a system can also be an object. In such a case, in a BLE mesh network, an electrical device can periodically broadcast its ID, independent of any other communication signals within the system. In such a case, example embodiments can be used in conjunction with the National Emergency Address Database (NEAD) and other similar programs. NEAD is a location database of BLE beacons being built in response to the Federal Communication Commission's (FCC's) mandate for improved indoor location accuracy during 911 calls. In this use case, the location of one or more BLE beacons (objects) are registered in a database. In the event of a 911 call, a mobile phone will scan for local BLE beacons and report their MAC addresses along with other location information to local dispatch to aid in emergency response. This could potentially make the system of electrical devices in an example system responsive to any 911 call made from any mobile device, potentially impacting building insurance rates and/or other ancillary factors.

Figure 9:
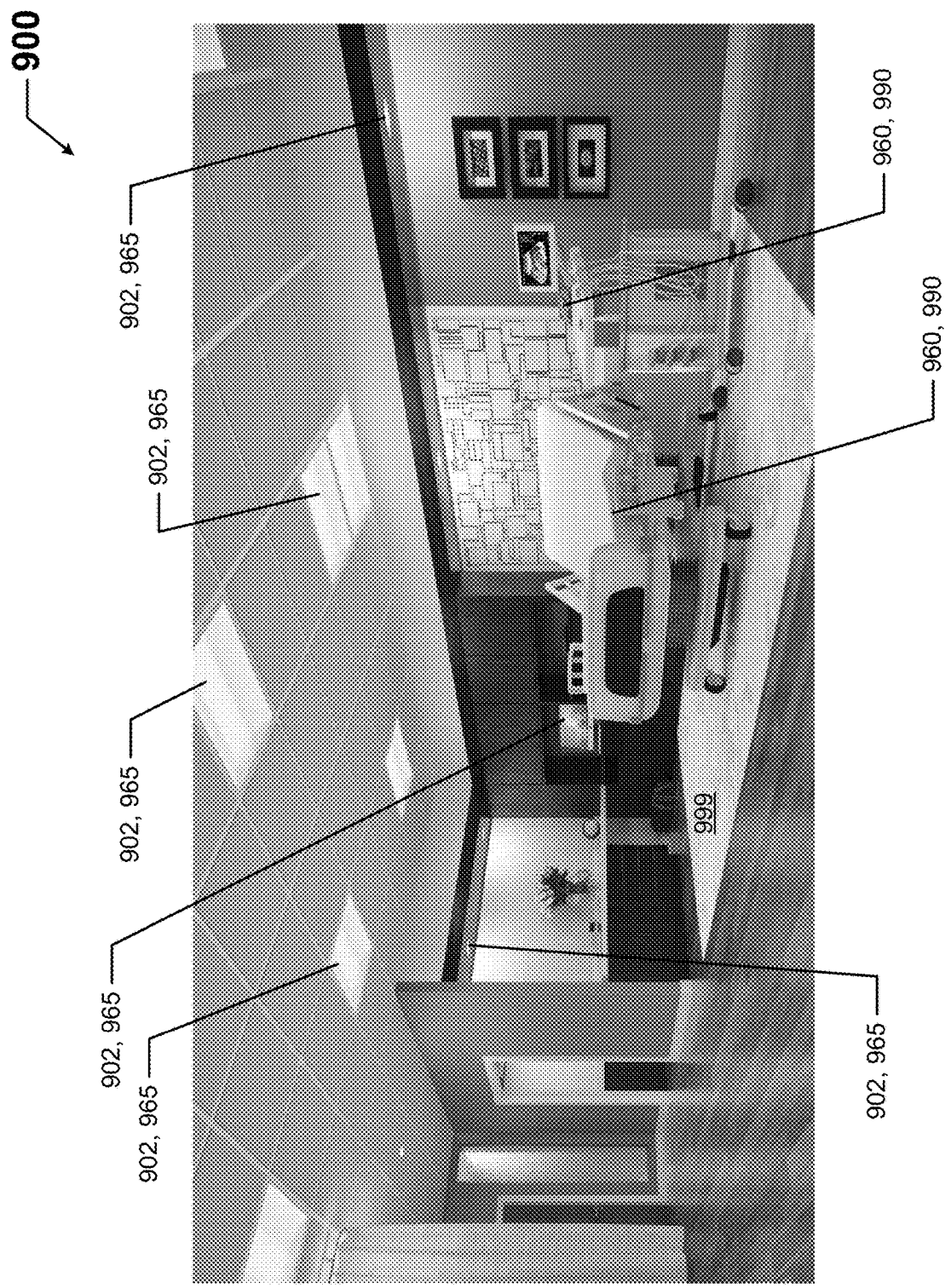
FIG. 9 shows a system in a healthcare environment in accordance with certain example embodiments.

FIG. 9 shows a system 900 that can be used for real-time location of an object 960 in accordance with certain example embodiments. Referring to FIGS. 1 through 9, the lighting system 900 includes a number of electrical devices 902, principally in the form of light fixtures, located in a volume of space 999 that includes a hospital room. A lighting system provides unique advantages for implementing an example RTLS because the density of the electrical devices (light fixtures) supports a dense network of sensors for locating and tracking objects.

Of the electrical devices 902 that are light fixtures, there are seven troffer light fixtures and five down can light fixtures disposed in the ceiling. There is also an electrical device 902 in the form of a computer monitor. In this case, each electrical device 902 includes a sensor device 965, substantially similar to the sensor devices 165 discussed above. There are also two objects 960 shown in FIG. 9. One object 960 is a test cart, and the other object 960 is a bed. Each object 960 in this case includes a communication device 990 that is capable of communicating with the electrical devices 902, including any integrated sensor devices 965.

Figure 10:
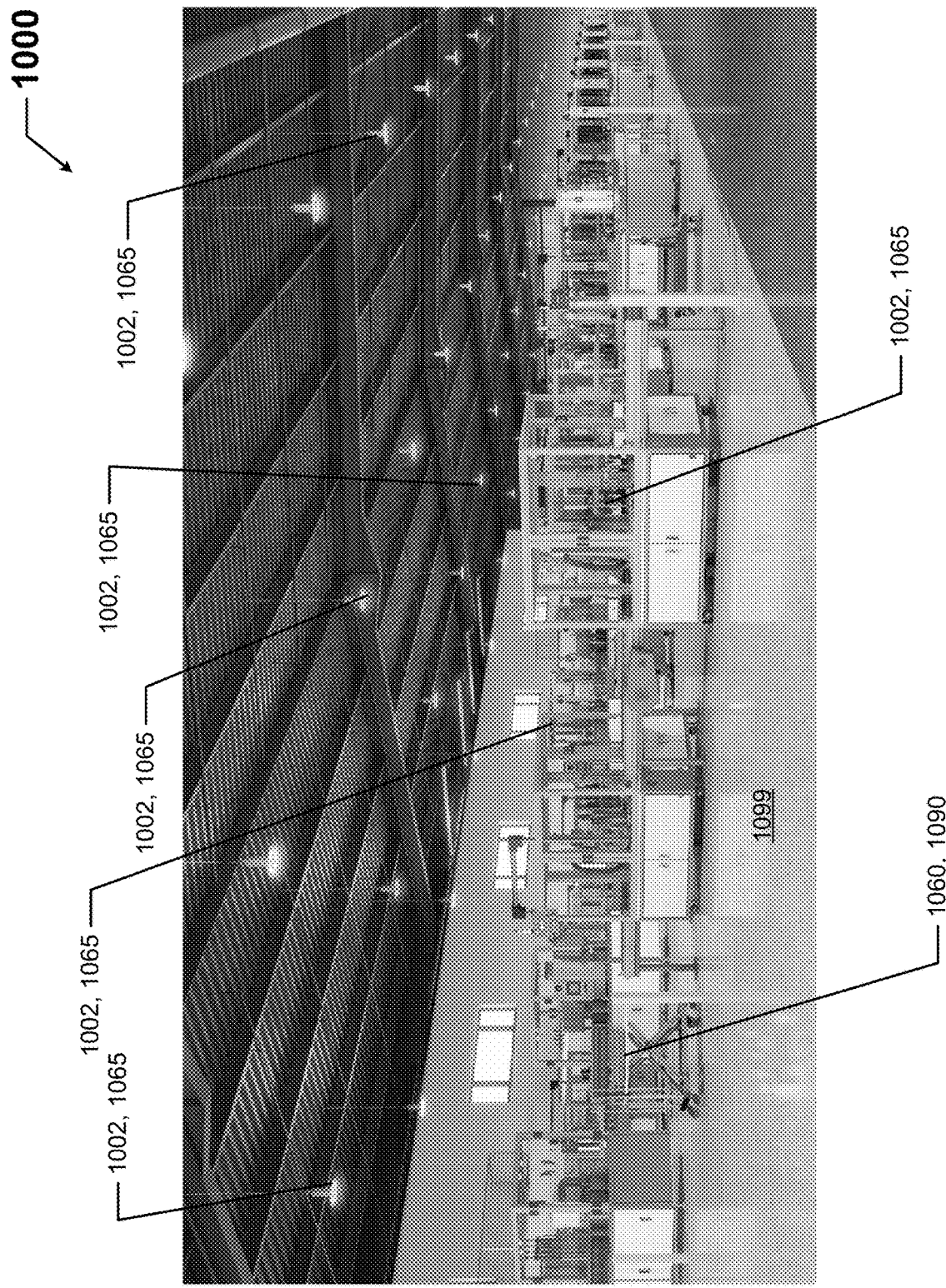
FIG. 10 shows another system in a manufacturing environment in accordance with certain example embodiments.

FIG. 10 shows another system 1000 that can be used for real-time location of an object 1060 in accordance with certain example embodiments. Referring to FIGS. 1 through 10, the lighting system 1000 includes a number of electrical devices 1002, principally in the form of light fixtures, located in a volume of space 1099 that includes a manufacturing facility.

Of the electrical devices 1002 that are light fixtures, there are at least 56 Hi-Bay light fixtures suspended from the ceiling and at least 30 work stations located on the floor. In this case, each electrical device 1002 includes a sensor device 1065, substantially similar to the sensor devices 165 discussed above. There is also an object 1060 shown in FIG. 10 that is in the form of a cart. The object 1060 in this case includes a communication device 1090 that is capable of communicating with the electrical devices 1002, including any integrated sensor devices 1065.

FIG. 11 shows a diagram of an integrated sensor module 965 in accordance with certain example embodiments. Referring to FIGS. 1 through 11, the integrated sensor module 1165 of FIG. 11 can include one or more of a number of components. Such components, can include, but are not limited to, a controller 1104 (which can include, for example, a control engine 1106, a communication module 1108, a timer 1110, a power module 1112, a storage repository 1130, a hardware processor 1120, a memory 1122, one or more transceivers 1124, an application interface 1126, and, optionally, a security module 1128) and one or more sensors 1139. The components shown in FIG. 11 are not exhaustive, and in some embodiments, one or more of the components shown in FIG. 11 may not be included in an example integrated sensor device 1165. Any component of the example integrated sensor device 1165 can be discrete, combined with one or more other components of the integrated sensor device 1165, and/or shared with the controller 104 of the electrical device 102-1 associated with the integrated sensor device 1165.

The controller 1104, the control engine 1106, the communication module 1108, the timer 1110, the power module 1112, the storage repository 1130 (which can include protocols 1131, algorithms 1132, and object data 1134), the hardware processor 1120, the memory 1122, the one or more transceivers 1124, the application interface 1126, and the security module 1128 can be substantially the same as the corresponding components of the controller 104 discussed above with respect to FIG. 1. In the case of the power module 1112 of the integrated sensor device 1165, the power module 1112 can be substantially the same as, at least in part, the power module 112 and/or the power supply 140 of the electrical device 102-1. As discussed above with respect to the sensor devices 165 of FIG. 1, each of the one or more sensors 1139 of the integrated sensor device 1165 are the components that actually measure one or more parameters. An example of a sensor 1139 is a PIR sensor. Each component of the integrated sensor device 1165 can be disposed within, on, or external from a housing 1138 of the integrated sensor device 1165.

In one or more example embodiments, multiple electrical devices (e.g., light fixtures) use receivers or transceivers (rather than merely transmitters) to receive communication (e.g., RF) signals to monitor the general location of one or more objects in a volume of space. The objects being identified and monitored include or have a beacon attached to them according to certain example embodiments. When multiple electrical devices are used, movement (at least in a general sense) of an object can be tracked. In such a case, a controller, a WAC, and/or a network manager can follow one or more protocols to take certain actions and/or control certain electrical devices in response to the location and/or movement of certain identified objects. Example embodiments are not concerned with finding the precise location of an object, and so example embodiments do not require high levels of processing or other resources, thereby reducing costs and improving efficiency. Example embodiments can provide real-time monitoring of the identification and location of an object in volume of space. Using example embodiments described herein can improve communication, safety, maintenance, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for monitoring a presence of an object in a volume of space, comprising:
a controller;
a first electrical device coupled to the controller, wherein the first electrical device is disposed in the volume of space and comprises a first receiver, wherein the first receiver has a first communication range;
a second electrical device coupled to the controller, wherein the second electrical device is disposed in the volume of space and comprises a second receiver, wherein the second receiver has a second communication range; and
an object comprising a beacon having an object communication range, wherein the beacon is capable of communicating with the first receiver when the object communication range overlaps with the first communication range, wherein the beacon sends a plurality of signals that are received by the first receiver when the object communication range overlaps with the first communication range, wherein each signal of the plurality of signals comprises an identification of the object, wherein the controller tracks receipt of the plurality of signals received by the first receiver over time, wherein the controller determines a first point in time when none of the plurality of signals is received, wherein the controller determines at the first point in time that the object is removed from a first location within the volume of space, wherein the first location is defined by the first communication range, wherein the second receiver, at the first point in time, receives one of the plurality of signals from the beacon of the object when the object communication range overlaps with the second communication range, wherein the controller further determines at the first point in time that the object is disposed within a second location within the volume of space, and wherein the second communication range defines the second location within the volume of space.

2. The system of claim 1, wherein the controller determines, at a second point in time, that the object is removed from the second location within the volume of space when the second receiver fails to receive a subsequent signal from the beacon of the object.

3. The system of claim 2, wherein the controller, at the second point in time, notifies a law enforcement agency that a robbery is in progress.

4. The system of claim 1, wherein the controller comprises a first controller and a second controller, wherein the first controller is part of the first electrical device and wherein the second controller is part of the second electrical device.

5. The system of claim 4, further comprising:
a network manager communicably coupled to the first controller and the second controller, wherein the network manager receives notifications from the first controller and the second controller at the first point in time that the object is removed from the first communication range and that the object is within the second communication range.

6. The system of claim 5, wherein the network manager notifies a user at the first point in time that the object has moved and provides a first general location of the object in the volume of space to the user.

7. The system of claim 5, wherein the network manager instructs the first electrical device, through the first controller, and the second electrical device, through the second controller, to operate for its intended purpose at the first time in response to the object being outside the first communication range.

8. The system of claim 5, wherein the network manager instructs an additional electrical device, through the first controller to operate for its intended purpose at the first time in response to the object being outside the first communication range, wherein the additional electrical device is unrelated to the first electrical device and the second electrical device.

9. The system of claim 1, wherein the object is a human being.

10. The system of claim 1, wherein the controller is part of the first electrical device.

11. The system of claim 1, wherein the first signal comprises an identification of the object.

12. The system of claim 1, wherein the first electrical device further comprises a light fixture.

13. The system of claim 1, wherein the first electrical device further comprises an antenna coupled to the first receiver, wherein the antenna is used to receive the plurality of signals.

14. The system of claim 1, wherein the first communication range of the first receiver is adjustable.

15. The system of claim 1, wherein the plurality of signals are radio frequency signals.

16. An electrical device used to locate an object in a volume of space, the electrical device comprising:
a receiver having a first communication range, wherein the receiver is configured to receive at least one object signal broadcast by an object when the at least one object signal is within the first communication range; and
a controller coupled to the receiver, wherein the controller is configured to determine, using the at least one object signal received by the receiver during a first time, that the object is located within the first communication range in the volume of space, wherein the controller is further configured to determine that the object has been moved at a second time when the receiver stops receiving the at least one object signal, wherein the controller is further configured to receive a notification from an additional electrical device at the second time, wherein the notification comprises information about a presence of the object within a second communication range in the volume of space, and wherein the second communication range is associated with a transceiver of the additional electrical device.

17. The electrical device of claim 16, wherein the controller monitors the activity of the object relative to the receiver using a table.

18. The electrical device of claim 16, further comprising:
a transmitter coupled to the controller,
wherein the controller is further configured to send, using the transmitter, a notification at the second time, wherein the notification comprises information about lack of presence of the object within the first communication range in the volume of space.

19. A system for monitoring a presence of an object in a volume of space, comprising:
a controller;
a first light fixture coupled to the controller, wherein the first electrical device is disposed in the volume of space and comprises a first receiver, wherein the first receiver has a first communication range; and
an object comprising a beacon having an object communication range, wherein the beacon is capable of communicating with the first receiver when the object communication range overlaps with the first communication range, wherein the beacon sends a plurality of signals that are received by the first receiver when the object communication range overlaps with the first communication range, wherein each signal of the plurality of signals comprises an identification of the object, wherein the controller tracks receipt of the plurality of signals received by the first receiver over time, wherein the controller determines a first point in time when none of the plurality of signals is received, wherein the controller determines at the first point in time that the object is removed from a first location within the volume of space, wherein the first location is defined by the first communication range, and
wherein the first light fixture communicates with at least one additional light fixture in an interconnected lighting system.

\* \* \* \* \*